(12) United States Patent
Zhdanov et al.

(10) Patent No.: US 11,983,244 B1
(45) Date of Patent: May 14, 2024

(54) ARTIFICIAL INTELLIGENCE SYSTEM FOR MEDIA ITEM CLASSIFICATION USING TRANSFER LEARNING AND ACTIVE LEARNING

(71) Applicant: Amazon Technologies, Inc., Seattle, WA (US)

(72) Inventors: Fedor Zhdanov, Seattle, WA (US); Emanuele Coviello, San Diego, CA (US); Benjamin Alexei London, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1406 days.

(21) Appl. No.: 16/017,892

(22) Filed: Jun. 25, 2018

(51) Int. Cl.
```
G06K 9/62       (2022.01)
G06F 16/635     (2019.01)
G06F 16/68      (2019.01)
G06F 18/214     (2023.01)
G06F 18/23      (2023.01)
G06N 20/00      (2019.01)
G10L 19/00      (2013.01)
```

(52) U.S. Cl.
CPC ........ *G06F 18/2155* (2023.01); *G06F 16/635* (2019.01); *G06F 16/686* (2019.01); *G06F 18/23* (2023.01); *G06N 20/00* (2019.01); *G10L 2019/0001* (2013.01)

(58) Field of Classification Search
CPC .... G06K 9/6259; G06N 20/00; G06F 16/686; G10L 2019/0001
USPC ......................................................... 706/12
See application file for complete search history.

(56) References Cited

U.S. PATENT DOCUMENTS

| | | | |
|---|---|---|---|
| 2007/0008956 A1* | 1/2007 | Moran | H04H 60/46 370/352 |
| 2014/0363138 A1 | 12/2014 | Coviello et al. | |
| 2018/0025287 A1* | 1/2018 | Mathew | G06N 5/04 706/12 |
| 2018/0129944 A1* | 5/2018 | Meunier | G06N 20/00 |
| 2018/0144241 A1* | 5/2018 | Liu | G06N 3/0454 |
| 2018/0285773 A1* | 10/2018 | Hsiao | G06N 20/20 |
| 2019/0188247 A1* | 6/2019 | Weinreb | G06F 16/14 |

(Continued)

OTHER PUBLICATIONS

Luke Barrington, et al., "Game-powered machine learning", PNAS, Retrieved from URL: www.pnas.org/cgi/doi/10.1073/pnas. 1014748109, Apr. 24, 2012, vol. 109, No. 17, pp. 6411-6416.

(Continued)

*Primary Examiner* — Jeffery A Williams
(74) *Attorney, Agent, or Firm* — Robert C. Kowert; Kowert, Hood, Munyon, Rankin & Goetzel, P.C.

(57) ABSTRACT

At an artificial intelligence system, training iterations of a first machine learning model are implemented. In a particular iteration, a group of data items are selected from an item collection using active learning, and respective labels selected from a set of tags are obtained for at least some of the items of the group. Using feature processing elements of a different machine learning model, a respective feature set corresponding to individual labeled items is generated in the iteration, and the feature sets are included in a training set used to train the first machine learning model. A trained version of the first machine learning model is stored after a training completion criterion is met.

20 Claims, 12 Drawing Sheets

(56) References Cited

U.S. PATENT DOCUMENTS

2019/0206575 A1* 7/2019 Batey .................. G06K 9/6223
2020/0097820 A1* 3/2020 Song .................... G06N 3/0454

OTHER PUBLICATIONS

Burr Settles, Active Learning Literature Survey, Technical Report, University of California, Santa Cruz, 2007, pp. 1-67.
Maria-Florina Balcan, et al., "The True Sample Complexity of Active Learning", Machine learning 80, No. 2-3, 2010, pp. 111-139.
Yoshua Bengio et al "Deep learning of representations for unsupervised and transfer learning" In ICML Unsupervised and Transfer Learning, 2012, pp. 1-21.
Thierry Bertin-Mahieux et al "The million song dataset" In Proc. ISMIR, 2011, pp. 1-3.
J. Bilmes, "A gentle tutorial of the EM algorithm and its application to parameter estimation for gaussian mixture and hidden markov models" International Computer Science Institute, 1998, pp. 1-38.
Keunwoo Choi et al "Towards playlist generation algorithms using rnns trained on within-track transitions", 2016, pp. 1-4.
Keunwoo Choi et al "Transfer learning for music classification and regression tasks", 2017, pp. 1-9.
D. Eck et al "Automatic generation of social tags for music recommendation" In Advances in Neural Information Processing Systems, 2007, pp. 1-8.
Katherine et al "A bag of systems representation for music autotagging" Audio, Speech, and Language Processing, IEEE Transactions on, 2013, pp. 1-16.
Shantanu Godbole and Sunita Sarawagi. Discriminative methods for multi-labeled classifica-tion. In PAKDD, 2004. pp. 1-3.
P. Hamel et al "Temporal pooling and multiscale learning for automatic annotation and ranking of music audio" In International Society of Music Informa-tion Retrieval, pp. 729-734, 2011.
Philippe Hamel et al "Transfer learn-ing in MIR: Sharing learned latent representations for music audio classification and similarity", 2013, pp. 1-6.
B. Logan. Mel frequency cepstral coefficients for music modeling. In International Society of Music Information Retrieval, vol. 28, 2000 pp. 1-2.
M.I. Mandel and D.P.W. Ellis. "Multiple-instance learning for music information retrieval" In Proc. ISMIR, pp. 577-582, 2008.
Michael I Mandel et al Support vector machine active learning for music retrieval: Multimedia systems, 2006.1-27.
V. Nair and G. Hinton "Rectified linear units improve restricted boltzmann machines" In International Conference on Machine Learning, pp. 807-814, 2010.
S.R. Ness et al "Improving automatic music tag annotation using stacked generalization of probabilistic svm outputs" In Proc. ACM Multi-Media, pp. 705-708, 2009.
Sinno Jialin Pan and Qiang Yang "A survey on transfer learning" IEEE Trans. on Knowl. and Data Eng., 22(10):1345-1359, 2010.
N. Srivastava et al "Dropout: A sim-ple way to prevent neural networks from overfitting" Journal of Machine Learning Research, 15(1):1929-1958, 2014.
Aaron van den Oord et al., "Transfer learning by super-vised pre-training for audio-based music classification" In Proc. ISMIR, 2014, pp. 1-6.
Jason Yosinski et al "How transferable are features in deep neural networks?", 2014, pp. 1-9.
M. Zeiler "Adadelta: an adaptive learning rate method", 2012, pp. 1-6.
Wenmin Zhang "Research on music genre classification method based on data mining technology" Revista de la Facultad de Ingenier'ia, 2017, pp. 1-10.
Emanuele Coviello, et al., "Time Series Models for Semantic Music Annotation", IEEE Transactions on Audio, Speech, and Language Processing, vol. 19, Nov. 5, Jul. 2011, pp. 1343-1359.
David D. Lewis, et al., "A Sequential Algorithm for Training Text Classifiers", Retrieved from cmp-lg/9407020, Jul. 24, 1994, pp. 1-10.
Y-Lan Boureau, et al., "A Theoretical Analysis of Feature Pooling in Visual Recognition", Proceedings of the 27th international conference on machine learning , 2010, pp. 111-118.
Douglas Turnbull, et al., "Semantic Annotation and Retrieval of Music and Sound Effects", IEEE Transactions on Audio, Speech, and Language Processing, vol. 16, No. 2, Feb. 2008, pp. 467-476.

* cited by examiner

ARTIFICIAL INTELLIGENCE SYSTEM FOR MEDIA ITEM CLASSIFICATION USING TRANSFER LEARNING AND ACTIVE LEARNING

BACKGROUND

Machine learning combines techniques from statistics and artificial intelligence to create algorithms that can learn from empirical data and generalize to solve problems in various domains such as natural language processing, financial fraud detection, terrorism threat level detection, human health diagnosis and the like. In recent years, more and more raw data that can potentially be utilized for machine learning models is being collected from a large variety of sources, such as sensors of various kinds, web server logs, social media services, financial transaction records, security cameras, and the like.

Classification, or the task of identifying to which of a set of categories (sub-populations) a new observation belongs, on the basis of learning from a training set of data containing observations or examples whose category membership is known, is one of the most useful and often-used categories of machine learning techniques. A number of algorithms for classification of different levels of sophistication have been developed over the years, including, for example, linear classifiers such as logistic regression algorithms, Bayesian classifiers, support vector machines (SVMs), decision-tree based algorithms, neural network-based algorithms and the like.

Many media-related services, such as music streaming or subscription services, may utilize classification algorithms to categorize large numbers of media data items (such as songs), e.g., for inclusion in virtual radio stations, for responding to media requests specifying a particular desired genre or mood, and so on. Often, as when a music service expands to a new country or linguistic region, a very large number of unlabeled media data items may become available, and labels may have to be assigned to at least a subset of the examples to generate an appropriate training data set for the particular classification algorithm being used. In order to assign the labels, in some cases media experts such as musicologists may have to be used. Generating a sufficient numbers of labeled examples may require substantial expert input, which may be hard to obtain. Furthermore, it is sometimes hard to determine the number of training examples that may eventually be required to train a media data item classifier that meets targeted quality requirements, since the extent to which different examples assist in the model's learning may differ. As a result of these and other factors, generating a training set of labeled media data item examples may often represent a non-trivial technical and resource usage challenge.

Figure 1:
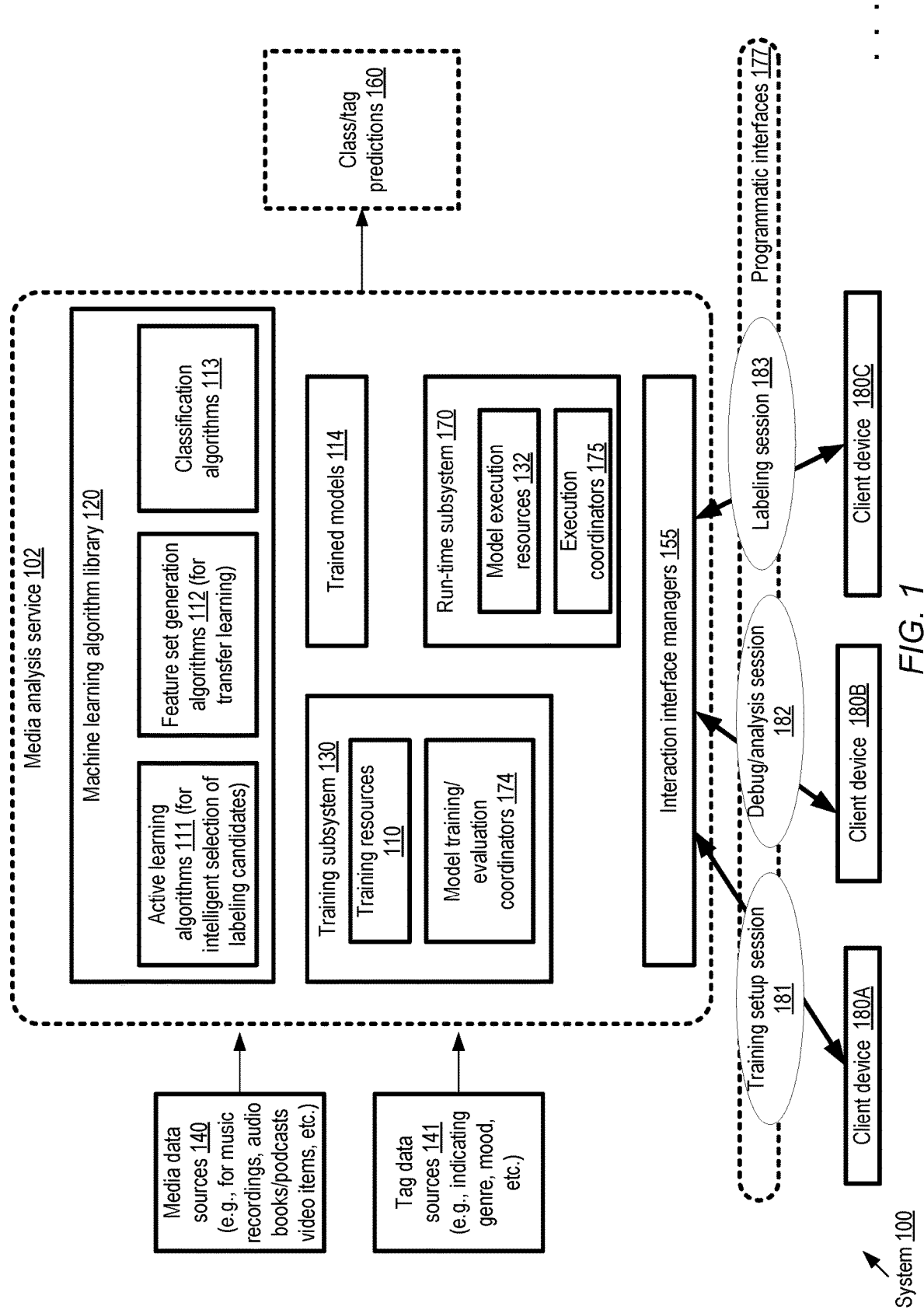
FIG. 1 illustrates an example system in which a combination of active learning and transfer learning may be employed to speed up the process of training classifiers for tagging media data items, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for efficiently developing machine learning models for classifying or tagging media data items, such as songs, videos and the like using a methodology which combines transfer learning and active learning are described. Generally speaking, transfer learning is an approach, often used for sequential learning problems, in which one can take a processing technique or a set of knowledge obtained in one set of experiments, and apply that processing technique or knowledge to another set of experiments in such a way as to reduce the amount of resources that would otherwise be consumed by the second set of experiments, and/or in such a way as to improve the quality of the results of the second set of experiments. In at least some types of machine learning problems in which data observations or examples have to be labeled or tagged so that they can be used for training a model, active learning is an approach that helps speed up the process of obtaining labeled data items that are collectively sufficient to develop a high quality model by quickly identifying "informative" candidates for labeling.

As one skilled in the art will appreciate in light of this disclosure, certain embodiments may be capable of achieving various advantages, including some or all of the following: (a) reducing the overall resources (including for example CPU/GPU resources, memory resources, other storage resources, network resources and the like) needed to prepare or train high-quality machine learning models for classifying very large catalogs of music and other media items, (b) enhancing the user experience of customers of media delivery services such as music streaming or video streaming services by enabling the services to more efficiently and accurately predict the types of media data items that the customers are likely to enjoy, and by responding more effectively to personalized requests for various types of media items, and/or (c) simplifying the user interface that label providers can utilize, e.g., by enabling the label providers to reactively use simple binary selectors to specify labels for media data items instead of having to proactively select and enter the labels themselves. In at least some embodiments, orders of magnitude reduction in the overall resources and time needed to train high-quality tagging models, as well as in the memory/storage needed to store training data, may be achieved using the described techniques.

The term "media data item" may be employed in various embodiments to refer to digital (or digitizable) content items that have at least some non-text content or non-text attributes; such content items may, for example, include recordings of individual songs, musical compositions that may or may not include vocalization or lyrics, videos, readings or audio recordings from books, magazine articles and the like, podcasts, images/videos of items of a product catalog (e.g., a catalog of an online retailer) and so on. The durations or lengths of individual media data items (the time that would be taken if the items were played back at a normal speed) may vary, and the sizes of the digital files or objects used to store the media data items may also vary (the size may depend for example, not only on the duration, but also on the fidelity or quality with which the original media data item is intended to be reproduced when played). The terms "tag" and "label" may be used in various embodiments to refer to names of categories or classes to which media data items may be assigned—e.g., tags such as "jazz" or "blues" or "$18^{th}$-century western classical" may be assigned to individual music data items. The categories to which media data items of a given catalog or set are to be assigned may themselves be identified and/or automatically generated at a variety of granularities in different embodiments, as discussed below. For example, in some embodiments, broad categories that are well-known in at least some cultures, such as (in the case of music) "jazz", "rock" and the like, may be used; in other embodiments, more specific labels/ categories such as "music liked by teenagers in Southern California" or even "music liked by individual X when driving to work in Washington D.C." may be used if desired for a particular application.

According to at least some embodiments, transfer learning and active learning may be employed together to develop a high-quality classification or tagging model for media data items using an iterative workflow which comprises the following kinds of operations. In some embodiments, such a workflow may be implemented at a network-accessible media analysis or classification service, e.g., as part of a suite of services offered by a provider network or cloud computing environment. First, at least one machine learning model that can be used to generate rich feature sets corresponding to individual media data items may be trained, or a trained version of such a model may be obtained. Such a model (or models) may be referred to as a feature generation model and/or as a transfer learning source model in some embodiments. This first model (or ensemble of models, from each of which a respective feature set may be obtained for a given media data item) may have been designed for any of various purposes—for example, it may itself have been developed to predict tags for some set of media data items, to identify similarities between pairs of media data items, (in the case of videos) to identify or classify objects, to detect unusual/unexpected sounds or unusual/unexpected objects for security management applications, to reproduce input media data items using an encoder-decoder pair, and so on. In some cases, as when the feature generation model comprises a deep neural network, considerable computation effort and time may be consumed in training the feature generation model. Once the model is trained, however, a rich feature set (e.g., a vector comprising 2048, 4096 or 8192 numerical elements) corresponding to any given media data item may be obtained using the model fairly rapidly and efficiently in various embodiments, and may be used for transfer learning—that is, the feature extraction knowledge or expertise gained during the training of the feature generation model may be transferred for the purposes of training a different model for classifying media data items as discussed below. In at least some embodiments, an internal feature processing or feature processing layer, or some combination of feature engineering layers, may produce the feature sets as a by-product; that is, the feature sets themselves may not comprise the kind of output or results for which the model was designed or developed.

The workflow for generating the tagging or classification model may further comprise obtaining a collection of as-yet-unclassified media data items and a set of tags to be assigned to individual items of the collection in various embodiments. One or more model training iterations (for a second machine learning model or a set of machine learning models, different from the feature generation model) which utilize the collection of unclassified media data items may be included in the workflow in some embodiments. Such model training iterations may be referred to as model preparation iterations in at least some embodiments. The second model may in at least some embodiments employ a different machine learning algorithm than the feature generation model—e.g., in one embodiment, the feature generation model may comprise a neural network, while the model used for predicting tags may comprise one or more logistic regression sub-models (e.g., one logistic regression sub-model per tag). A given iteration may, for example, include selecting, based at least in part on one or more active learning algorithms, a group of one or more media data items of the collection, for which labeling feedback is to be obtained. In some cases, the active learning algorithms may utilize one or more machine learning models that were trained in a previous iteration—e.g., output obtained from such models may be analyzed using active learning to identify media data items that are likely to be beneficial for training the second machine learning model if the items are labeled and included in the training set of the second machine learning model. The size of the group may be based on various factors in different embodiments, such as the type of machine learning algorithm being used, the number of available label providers, or one or more properties of the interaction interface being used for the labeling feedback. For example, if the interaction interface requires label providers to spend a substantial amount of time comparing media data items before making a judgement about a label, fewer media data items may be included in the group in one embodiment.

In some embodiments, a training iteration may also comprise obtaining, from one or more label providers via one or more programmatic interfaces, respective labels for one or more media data items of the group identified using active learning; such labels may include tags from the set of tags identified for the collection of media data items. Also as part of the training iteration, in at least one embodiment a respective feature set may be generated, using the feature generation or transfer learning source model(s), for individual ones of the media data items for which labels were obtained. In addition, the iteration may comprise training, using a training set which includes the features obtained for the labeled media data items, the second machine learning model to predict tags for individual media data item. The iterations may be performed until a training completion criterion is met in various embodiments—e.g., until a desired tag prediction quality is achieved by the second model, or until a resource or time budget set aside for training the second model is exhausted. A trained version of the second machine learning model(s), e.g., the version produced in the final training iteration, may be stored in at least some embodiments.

Such a trained model may be used to generate tags for one or more media data items as needed, and/or to respond to media-related requests, e.g., at a media distribution/streaming service, at various client-side devices such as cell phones, personal assistant devices and the like in various embodiments. For example, results of the trained model (and/or the feature generation model, if that model is also a tag predictor or classifier) may be used to respond to a request, submitted at a voice-driven personal assistant device, to play a particular kind of music, or to include a particular song in a personalized playlist or a virtual radio station generated for a client of a music service, and so on in different embodiments.

In some embodiments, the feature generation model may itself be a tag prediction model, trained on a particular collection of media data items. In one such embodiments, the second machine learning model, trained using feature sets produced by the feature generation model, may be used to generate labels that belong to either of the sets of tags used during the training workflow—e.g., tags that were used to train the feature generation model and/or tags that were identified for classifying the collection of data items used during the training iterations of the second machine learning model.

Tag prediction or classification may be performed for various kinds of media data items in different embodiments. For example, in one embodiment at least one media data item for which a tag is predicted may comprise one or more of a) at least a portion of a music recording, (b) at least a portion of an audio recording of a book, a podcast, or a magazine article, or (d) at least a portion of a video. According to at least one embodiment in which the tags are to be predicted for music examples, the feature engineering elements of the feature generation model may comprise various layers. Such layers may include, among others, (a) a principal component analysis (PCA) model to transform spectral features of the individual music examples, (b) a Gaussian mixture model to generate respective audio codebook histograms corresponding to the individual music examples and/or (c) temporal pooling of audio codebook histograms corresponding to the individual music examples.

Metrics or results obtained from any combination of one or more active learning algorithms may be used to select candidate media data items for labeling in various embodiments. Such active learning algorithms may, for example, include (a) an uncertainty sampling algorithm, (b) a query by committee algorithm, (c) an expected model change algorithm, (d) an expected error reduction algorithm, (e) a variance reduction algorithm, and/or (f) a density-weighted algorithm. In some embodiments, inputs to the active learning algorithms during a given training iteration may include, for example, results obtained from versions of one or more classifiers trained in the previous iteration—e.g., the variance among the results obtained by various classifiers of a committee may be used to rank media data items as candidates for labeling, with media data items with higher variance being ranked higher than items with lower variance. Similarly, any of various models and algorithms may be used as the transfer learning source model or feature generation model in different embodiments. For example, the feature generation model(s) may in some embodiments comprise one or more of (a) a model used to predict one or more tags for individual media data items, (b) an encode-decoder model trained to replicate media data items provided as input to the encoder-decoder model, (c) a model used to identify, with respect to an input media data item, one or more other media data items which meet a similarity criterion with respect to the input media data item, and/or a (d) a model which concatenates at least a portion of a text attribute of an input media data item to a feature vector derived from one or more non-text attributes of the input media data item. Any of several types of classification algorithms may be used at either model (the feature generation model, or the tag prediction model) in different embodiments, including neural network-based models, one or more logistic regression models, support vector machine (SVM) models, Bayesian models (e.g., naïve Bayesian models), decision tree-based models, and the like.

The labels/tags for the media data items of the training sets of either or both of the two machine learning models—the feature generation model, and the tag prediction model—may be obtained from a variety of sources in different embodiments. For example, in some embodiments, an automated feedback analyzer which analyzes explicit or implicit consumer feedback (e.g., records indicating how long various pieces of media were watched/listened to, positive and negative feedback provided by media consumers, etc.) with respect to one or more media sources/outlets may generate proposed tags/labels, or a pool of one or more media data item annotators (such as music experts or musicologists, in scenarios where music data items are to be classified) may be used. In one embodiment, simple user interfaces may be implemented to obtain tags for the candidate media data items identified using active learning. For example, at least one tag may be obtained via an interactive programmatic interface which includes, corresponding to a particular media data item, (a) a tag name of a first tag of the set of tags and (b) a binary selector for the first tag. A first setting for the binary selector may, for example, indicate that the particular media data item is to be labeled with the first tag name, while the second setting for the binary selector may indicate that the particular media data item is not to be labeled with the first tag name. As such, instead of requiring a label provider to come up with the tag names that are appropriate for a given media data item, a set of one or more proposed tags (which may have been identified during the active learning analysis) may be presented to the label provider, who can indicate using a simple yes/no toggle whether a given proposed tag should be applied or not. In at least one embodiment, if a label provider wishes to, one or more alternate tags (different from the tags proposed automatically by the classification tool or service) may be proposed by a label provider via the interactive interface.

Example System Environment

FIG. 1 illustrates an example system in which a combination of active learning and transfer learning may be employed to speed up the process of training classifiers for tagging media data items, according to at least some embodiments. As shown, system 100 may comprise resources and artifacts of a media analysis service 102, including a training subsystem 130 and a run-time subsystem 170 in the depicted embodiment. Media data items to be used to train models and/or to exercise trained models 114 may be extracted from a variety of media data sources 140 in some embodiments, which may include static data sources as well as dynamic data sources (such as streaming data sources which collect and/or emit media data items on an ongoing or continuous basis, e.g., based on signals collected at various types of sensors or other devices). In different embodiments, classification/tagging of items of a variety of media types may be performed at media analysis service 102, including among others music items such as songs, instrumental music pieces, video recordings, audiobooks, podcasts and the like. In at least some embodiments, the tags or labels to be assigned to (or predicted for) various media data items may be obtained from one or more tag data sources 141; a given tag may, for example indicate a genre, mood or some other set of properties/characteristics of a given media data item. Note that in general, a given media data item may be assigned zero or more tags using machine learning techniques implemented at media analysis service 102—that is, a given media data item may not necessarily be assigned to just one category or class.

A variety of machine learning algorithms may be available at library 120 for use during various stages of training, evaluation and/or execution of machine learning algorithms for numerous types of media analysis and classification problems in different embodiments. In the depicted embodiment, three broad categories of algorithms are shown by way of example: active learning algorithms 111, feature set generation algorithms 112, and classification algorithms 160. Note that these categories of algorithms may overlap in some embodiments—e.g., a classification algorithm may also be used for feature set generation, or a collection of classification algorithms may be employed for active learning.

Various combinations of machine learning algorithms 120 may be used to accelerate the iterative training of classifiers (tag predictors) for media data items in the depicted embodiment. In various embodiments, active learning algorithms 111 may be used during various training iterations to select, given a set of media data items, an "impactful" or "influential" subset to be labeled in preference to other subsets; the subset may be selected, for example, based on the estimated benefit that labeling the subset (and including the subset in training data sets) would result in with respect to the training of the classification model being developed. Such subsets may be referred to as preferred labeling feedback candidates in some embodiments. As discussed below, any of a variety of active learning-based labeling candidate selection approaches may be adopted in different embodiments. After a given set of preferred labeling candidate media data items is identified, respective labels for at least some of the members of the set may be obtained in one or more labeling sessions 183 via programmatic interfaces 177 in the depicted embodiment. Note that in some cases, e.g., based on the label providers available and the productivity of the label providers, labels may not necessarily be obtained for all the labeling candidates selected in a given iteration before the next round of training of the tag prediction model is initiated.

From the media data items for which labels are obtained in a given training iteration, respective feature sets (e.g., numeric vectors of length 2048, 4192 or 8192, where the dimensionality of the vectors is a meta-parameter of the training iterations) may be obtained using one or more machine learning models implementing the feature set generation algorithms 112. For example, in some embodiments, internal layers of deep neural network models may be employed to generate the feature sets. The feature sets and the labels may be included in the training sets of one or more classification algorithms 113 to be used for tag prediction, such as logistic regression algorithms, neural network based algorithms and the like. The quality or accuracy of the predictions made by the trained classifier(s) of a given iteration may be evaluated using any of a variety of metrics (such as precision, recall and the like, obtained using a hold-out test set) in different embodiments. If the quality meets a target criterion or threshold, and/or if a budget of resources or time designated for the training has been exhausted, training iterations may be terminated in some embodiments. Otherwise, output of the current versions of the classifiers (and/or other models updated in the current training iteration) may be used as input to the active learning algorithms to identify the next set of labeling candidates for the next iteration in various embodiments, and similar labeling sessions, feature generation and training of the classifier to be used for tag predictions may be performed for the next training iteration. After the training iterations are terminated, in various embodiments a final trained model 114 may be stored, and used to generate predictions 160 for media data items whose feature sets were not part of the training sets of the completed iterations.

In the depicted embodiment, separate sets of resources may be used for the training iterations than for the execution of the trained classifier. Model training/evaluation coordinators 174 of training subsystem 130 may utilize a set of training resources 110 for the training iterations, while execution coordinators 175 may use model execution resources 132 of run-time subsystem 170 to obtain class predictions 160 using the trained versions 114 of the classifier. In other embodiments, at least some resources may be shared among the training phase and the post-training execution of the tag prediction model(s). The class/tag predictions 160 corresponding to media data items may be transmitted to one or more destinations, and/or stored as part of a catalog of a media service.

The media analysis service 102 may implement a collection of programmatic interfaces 177, including for example web sites or pages, graphical user interfaces, command line tools and/or APIs, which can be used for interactions between various types of users and the service 102 in various embodiments. At least three broad categories of programmatic user interactions may be supported in the depicted embodiments: classifier training setup sessions 181, debug/analysis sessions 182 and interactive labeling sessions 183.

In training setup sessions 181, in some embodiments an authorized user such as a business unit or department manager or some other stakeholder interested in classifying/tagging a collection of media data items may use a client device 180A (e.g., a desktop, laptop, tablet computing device, smart phone or the like) to initiate the process of training one or more classifiers, e.g., by submitting a programmatic training request to the service 102. In debug/analysis sessions 182, in some embodiments data scientists, subject matter domain experts and the like may use client devices 180B to examine the progress of classifier training, to modify various parameters or hyper-parameters based on observed metrics, status information and the like. In interactive labeling sessions 183, as mentioned above, in various embodiments one or more label providers may be presented at client devices 180C with candidate media data items for which labeling feedback is requested, and such label providers may submit labels for the candidate items using the interfaces. Intuitive, easy-to-use feature-rich customizable interactive programmatic interfaces 177 may be provided for each of the three categories of user sessions indicated in FIG. 1 in various embodiments; details of some aspects of the interfaces are provided below. Note that a single user session need not necessarily be limited to one type of interaction in at least some embodiments—e.g., a single user may setup classifier training, provide labels when needed, and/or debug/analyze the progress of the training via the same session. At the media analysis service 102, one or more interaction interface managers 155, implemented using one or more computing devices, may receive messages submitted programmatically from the client devices 180, pass on internal versions of the communications to other components of the service 102, receive internal responses from such components, and provide external responses to the messages via the programmatic interfaces 177 to the users as needed.

Iterative Training Workflow Overview

Figure 2:
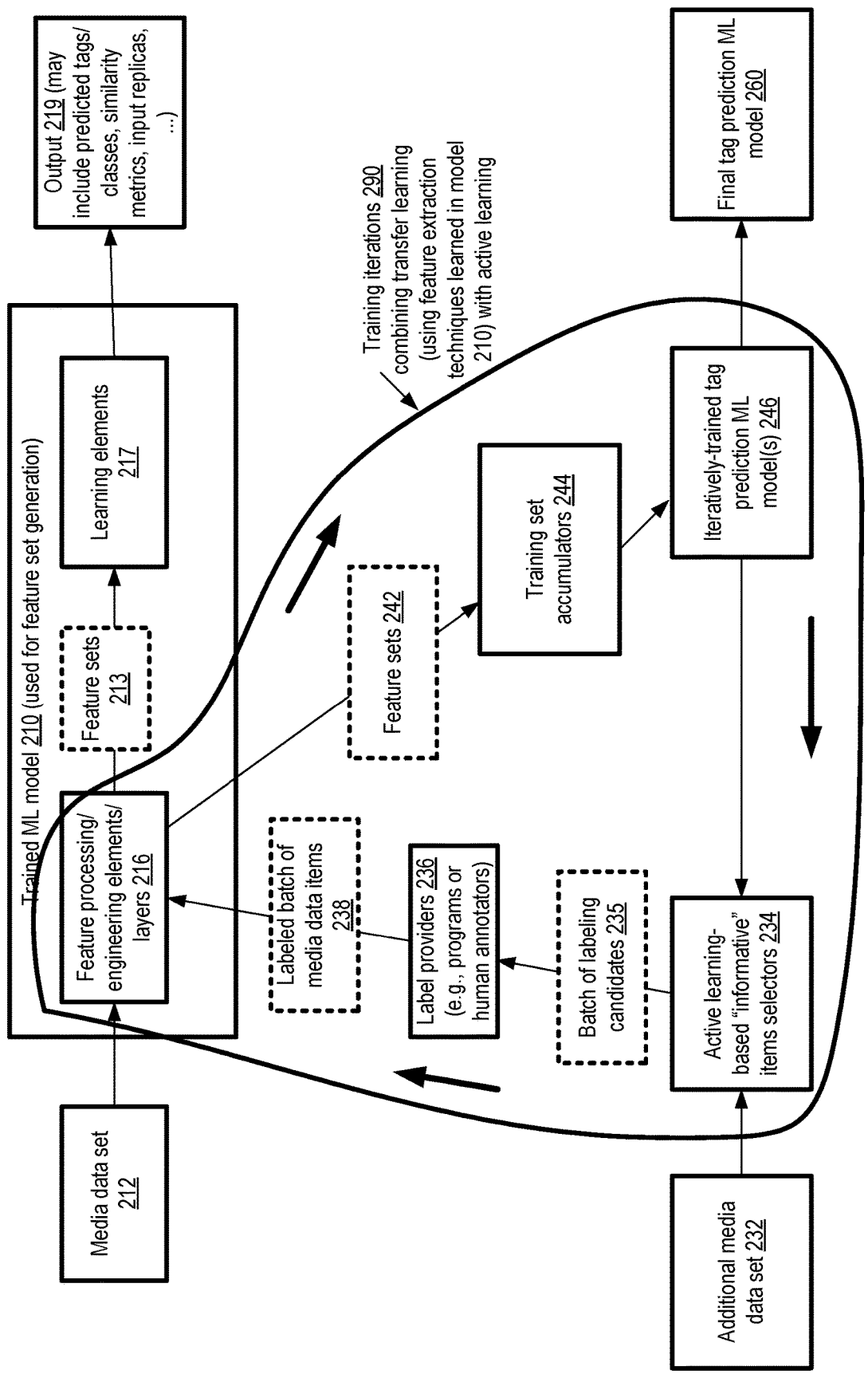
FIG. 2 illustrates an overview of an iterative technique to train a machine learning model to predict tags for media data items, in which a training set comprising features obtained from a different previously-trained model is accumulated using active learning techniques, according to at least some embodiments.

FIG. 2 illustrates an overview of an iterative technique to train a machine learning model to predict tags for media data items, in which a training set comprising features obtained from a different previously-trained model is accumulated using active learning techniques, according to at least some embodiments. As shown, a first machine learning model 210 may be trained in the depicted embodiment and used for generating feature sets that can be included in the training set of one or more other machine learning models, the tag prediction models 246. A media data set 212 may be consumed as input of the first model 210. Internally, the model 210 may comprise one or more feature processing or feature engineering elements or layers 216, which extract feature sets 213 from individual media data items of data set 212. The model 210 may also include one or more downstream learning elements 217 in at least some embodiments (e.g., in embodiments in which a deep neural network is used for the model, one or more layers of neural network nodes) to which the feature sets 213 are provided as input. The downstream learning elements 217 may eventually generate the output 219 of the first ML model. The first ML model may have been designed for any of a variety of purposes or tasks in different embodiments—for example, in one embodiment model 210 may itself be used to predict tags/classes for media data items, while in other embodiments it may be used to produce similarity metrics for pairs of media data items, or to replicate input media data items using an encoder/decoder combination.

A different media data set 232 may be used to train the tag prediction model(s) 246 in the depicted embodiment. Initially, in at least some embodiments, the vast majority (or all) of the media data items of data set 232 may be unlabeled. The objective of the iterative training iterations 290 depicted in FIG. 2 may in some embodiments comprise gradually increasing the number of labeled media data items of data set 232, choosing some subset or batch of informative or useful unlabeled media data items as candidates for labeling in each iteration, extracting the features of those labeled items using the feature processing elements 216 of the model 210, and incorporating the features into a growing training data set used for training model(s) 246. As a result of such an approach, in various embodiments the targeted quality of tag predictions may be obtained from model(s) 246 efficiently, without for example having to label a large majority of the items of data set 232, while utilizing much less CPU, memory, storage, and other resources than may have been required if either active learning or transfer learning from model 210 had not been used.

In a given training iteration 290, items selectors 234, implemented at one or more computing devices, may identify a new batch 235 of one or more labeling candidates from among the set of remaining unlabeled media data items of data set 232. Results of the most recently trained versions (e.g., the versions obtained in a previous training iteration) of one or more machine learning models, e.g., including the tag prediction model(s) 246, may be used to rank or order the labeling candidates, so that for example the N unlabeled media data items that are estimated to be most helpful in improving the quality of the tag prediction models 246 if they were labeled may be included in the batch 235. The size of the batch 235 may be selected based on a variety of factors in different embodiments. For example, the batch size may be selected in some embodiments based at least partly on the kind of models/algorithms being used for tag prediction (e.g., logistic regression models may not require as many training examples as neural network based models, so a smaller batch size may be selected for logistic regression models), the number of label providers available and their individual responsiveness, the particular type of interface or mechanism via which the labels are to be collected (e.g., if a group of human label providers are required to convene and arrive at a consensus on the labels, the relatively high overhead of the label gathering process may suggest that a larger batch size should be used), etc.

Labels for at least some of the media data items of the batch 235 may be obtained from a pool of one or more label providers 236 (e.g., including one or more human annotators via sessions similar to sessions 183 of FIG. 1, and/or one or more automated programs) in the depicted embodiment. Corresponding to individual ones of the labeled media data items 238, respective feature sets 242 may be extracted using the feature processing or feature engineering elements 216 of model 210, thus transferring learning from model 210 in the depicted embodiment. Training set accumulators 244 may add the feature sets to the current training set of the tag predictor model(s) 246, and the model(s) 246 may be trained using the expanded training set. If the quality of the predictions (which may for example be evaluated using a test set of labeled media data items that were not included in the training set) is acceptable and/or a resource budget for training the tag predictors is exhausted, training iterations 290 may be terminated in various embodiments. The training iterations 290 may be conducted at a training subsystem comprising one or more computing devices of a media analysis or classification service in various embodiments, similar to the training subsystem 130 of FIG. 1. A final version 260 of the tag prediction model may be stored in some embodiments, and/or deployed to one or more run-time execution platforms (e.g., similar to the platforms of run-time subsystem 170 of FIG. 1) to generate tags for new unlabeled media data items that were not included in the training set.

Note that in at least some embodiments, the feature sets 242 corresponding to the batch 235 of informative media data items may be generated in parallel with, or even prior to, obtaining the labels from label providers 236—that is, obtaining the labels may not be a prerequisite for generating the features. In some embodiments, the submission of labels by label providers may be asynchronous with respect to the training of the tag prediction model(s)—e.g., label providers may submit labels requested for individual media data items at their own pace, and the models may be trained using the set of available labeled data items, without waiting for the entire batch to be labeled. In various embodiments, a given training iteration 290 may be considered to begin either with the feature extraction operations or the active learning operations, depending on how one prefers to define the boundaries of the iterations.

Example Algorithms

Figure 3:
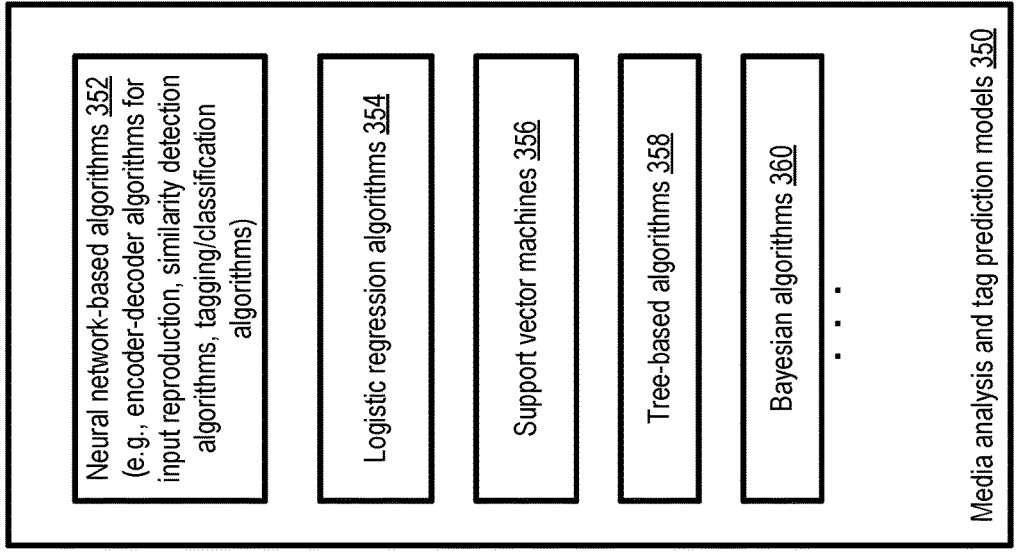
FIG. 3 illustrates examples of active learning algorithms, as well as examples of models that may be used for tag prediction, according to at least some embodiments.
Figure 3:
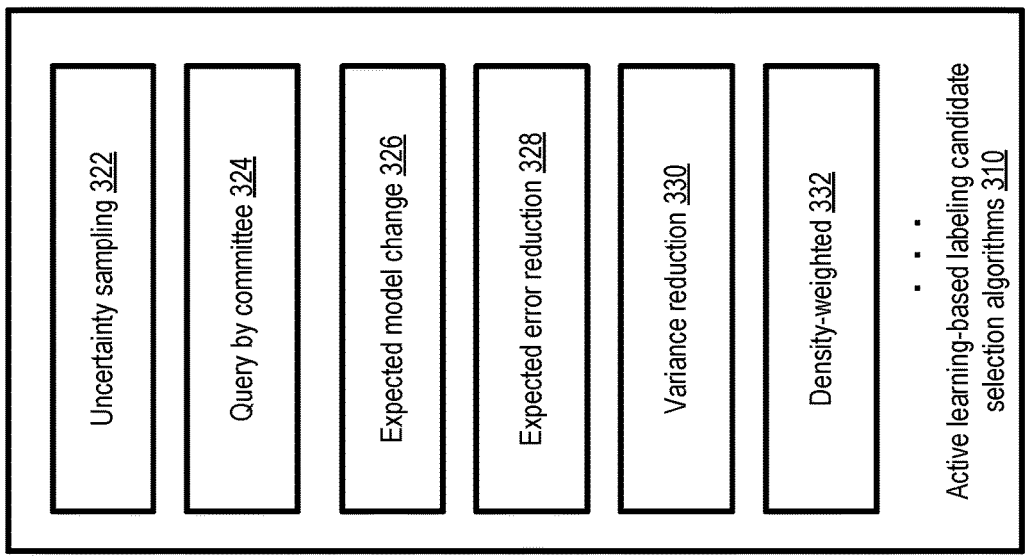

Within the overall framework of combining active learning with transfer learning, a wide variety of algorithms may be employed for various stages of the iterative tag predictor development and deployment workflow described above in different embodiments. FIG. 3 illustrates examples of active learning algorithms, as well as examples of models that may be used for tag prediction, according to at least some embodiments. Active learning algorithms 310 used to select labeling candidates may include, among others, uncertainty sampling 322, query by committee 324, expected model change algorithms 326, expected error reduction algorithms 328, variance reduction algorithms 330, density-weighted algorithms 332 and the like. In some embodiments, multiple such active learning algorithms may be used in combination.

Generally speaking, active learning is based on the assumption that in environments where obtaining labels for data item examples to be used for training machine learning models is expensive, it may often be the case that a small subset of a given input data set contains much of the information that can be extracted from the data set as a whole. Therefore, if such a small subset were identified and labeled, the remaining data items may not have to be labeled at all. For example, in a binary classification problem such as music tagging (where, for a given music item, a binary label may be needed with respect to a given tag representing a genre or mood), one could learn the optimal (large-margin) hyperplane from only the examples that lie near the decision boundary; thus, drawing labeled examples at random from the data set may be inefficient and/or wasteful. In contrast, active learning lets the learning algorithm (e.g., an algorithm being used for the tag prediction model) inform the data collection process, so as to focus on examples that have the most utility for the current state of the model.

An active learning algorithm's success may hinge on the criteria used to select the examples. In embodiments in which uncertainty sampling 232, examples (e.g., media data items) that would tend to reduce the current model's uncertainty may be selected in preference to others. Intuitively, the media data items for which the tag prediction model is least confident currently may be assumed to provide the most useful information when labeled. In at least some embodiments, a confidence-based criterion may be used to select the batch of media data items designated as labeling feedback candidates. Given a model that outputs a conditional probability p(Y|X) for a binary (Bernoulli) variable Y, the confidence-based uncertainty score u may be computed using the following formula UF1 in at least some embodiments:

$$u = 1 - 2|p(Y|X) - \tfrac{1}{2}| \qquad \text{UF1}$$

In the UF1 formulation, u is the conditional probability's proximity to a random coin flip. Given uncertainty scores for a set Du of available unlabeled media data items ($u_1$, $u_2$, ..., $u_{|Du|}$), a size-B subset (where B is a batch size parameter) with maximum aggregate uncertainty may be selected in various embodiments in which uncertainty sampling is employed, e.g., using the formulation BF1:

$$\arg\max\nolimits_{S \subseteq \{1,\ldots,|Du|\} : |S|=B} \Sigma_{i \in S} u_i \qquad \text{BF1}$$

Note that this selection is deterministic. In other embodiments, probabilistic sampling proportional to the uncertainty scores may be used. Generally speaking, the smaller the batch size B, the quicker the model may be able to adapt, hence potentially reducing wasted annotation/labeling effort. In various embodiments, as mentioned earlier, a number of factors may be used to determine B, which may be considered a hyper-parameter of the overall tag prediction development workflow.

In some embodiments in which a query by committee (QBC) algorithm 324 is used, a committee of models that represent competing hypotheses may all be trained using a currently labeled set of media data items. Each committee member may then be allowed to vote on the predicted tags of various unlabeled media data items, and those items on which there is the greatest disagreement among the predictions may be selected as the batch for which labels are to be obtained.

As suggested by its name, in embodiments in which the expected model change algorithm 326 is employed, the unlabeled media data items that would impart the greatest change to the current tag prediction model if their labels were known may be selected as labeling candidates. In some embodiments in which gradient-based tag prediction models are used, the metric of the change to the model may, for example, comprise the length of the training gradient.

In at least some embodiments, an expected error reduction algorithm 328 may be employed, in which candidates for labeling may be selected based on minimizing expected future error or risk. In one embodiment, a variance reduction algorithm 330 may be employed, in which generalization error may be reduced indirectly by including new media data items such that the output variance of the tag prediction model being used is minimized. In embodiments in which a density-weighted algorithm 332 is employed, labeling candidates may be selected based at least in part on the basis of being representative of the underlying distribution (i.e., those media data items that inhabit more dense regions of the input space may be preferred). As mentioned earlier, combinations of various active learning methodologies and algorithms may be used in some embodiments.

A number of different types of models 350 and/or algorithms may be used, singly or in combination, for tag prediction or classification of media data items, and/or for other types of media analysis (from which feature sets may be extracted) in various embodiments. For example, in some embodiments, neural network-based algorithms 352 may be employed; in other embodiments, logistic regression algorithms 354, support vector machines (SVMs) 356, tree-based algorithms 358, Bayesian algorithms 360 and/or other algorithms not shown in FIG. 3 may be used. In at least some embodiments, neural network-based models may be used for transfer learning—e.g., feature vectors generated at an internal layer of an already-trained deep neural network model (which may have been developed to predict tags for some media data items, to determine similarities between pairs of media data items, to reproduce input media data items using an encoder/decoder combination, or the like) may be used as part of the training data for the tag prediction model. Other types of models and algorithms, not shown in FIG. 3, may be used for tag prediction, feature set generation and/or active learning in various embodiments.

Example of Feature Engineering for Transfer Learning

Figure 4:
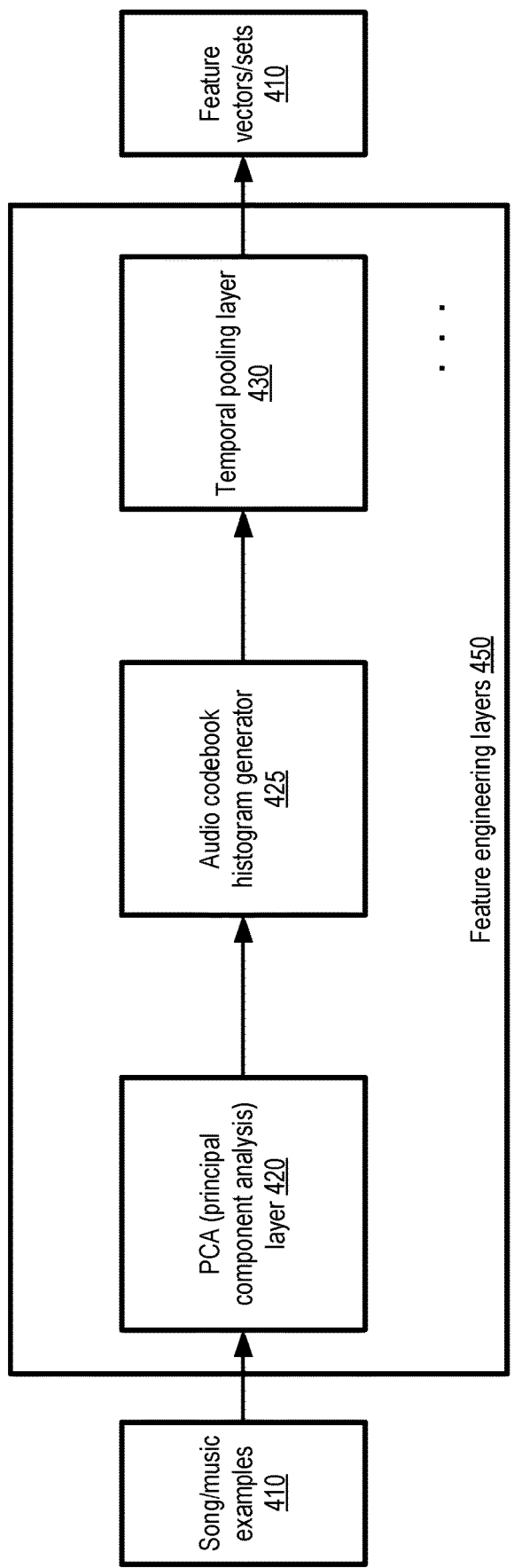
FIG. 4 illustrates example feature engineering techniques that may be employed to generate feature sets for music items, according to at least some embodiments.

In some embodiments, as mentioned earlier, tag prediction models may be generated for music items such as songs, instrumental compositions, and the like. FIG. 4 illustrates example feature engineering techniques that may be employed to generate feature sets for music items, according to at least some embodiments. The feature sets may be created for newly-labeled data items to intelligently expand the training sets of the tag prediction models in various embodiments as discussed earlier.

In the embodiment depicted in FIG. 4, digitized representations of songs or music examples 410 may first be passed through a principal component analysis (PCA) layer 420. To represent the acoustic content, in some implementations N-bin Mel-frequency spectral features over half-overlapping windows of a selected duration (e.g., some number of milliseconds) may be computed. A PCA transformation may then be employed to project the spectral features onto some number of principal components. In some embodiments, the first and second instantaneous derivatives of the projected features may be appended, resulting in a low-level audio feature vector per music item.

In a subsequent step, the low-level audio features may be encoded using an audio code-book of Gaussian codewords at histogram generator 425 in some embodiments. A Gaussian mixture model (GMM) of a selected number of components (e.g., 2048) may be fitted over the extracted low-level audio features, e.g., using expectation maximization. The individual Gaussian components may statistically describe prominent audio features in the corpus of music data items 410, and may be used as codewords in an audio codebook. If the codebook is sufficiently large, and learned from a music corpus that is sufficiently large and diverse, a rich representation of the music items 410 may thereby be obtained in at least some embodiments. Given the GMM, individual ones of the music items may be encoded as a sequenced of audio codebook histograms in various embodiments, e.g., by mapping each of the audio feature vectors to a vector of posterior probabilities.

In layer 430 of the feature engineering layers 450, temporal pooling may be utilized to summarize the sequence of histograms of a given music item over the duration of the music item. This technique may have the advantage that variable-length sequences of features may be transformed to compact fixed-length feature vectors which are invariant to shifts in time, and are robust to noise. In some implementations, max and mean pooling may be concatenated to capture both average and locally prominent codewords. In some embodiments, a respective feature set or vector 410 of a selected length L (e.g., 2048, 4096 or 8192 elements) may be constructed for each music item.

In at least some embodiments in which the feature engineering layers 450 are used to generate features for a tag prediction model (i.e., in scenarios in which the feature generation model is also a tag prediction model), a neural network-based binary relevance model may be used to predict the probability of individual tags given the input feature sets 410. In one such embodiment, the output layer of a multi-layer neural network may, for example, consist of a respective sigmoid unit for each tag, and each conditional probability may be parameterized by a shared, learned representation given by the hidden layers of the neural network. In various embodiments, the learning objective of such a neural network model may comprise finding the network parameters that maximize the likelihood of the true labels or tags under the model's conditional distribution, e.g., by minimizing the binary cross-entropy loss averaged over all the media data items and tags.

After the feature generation model of which the feature engineering layers 450 are a part is trained, it may be used to generate feature sets 410 for any new music examples as desired, e.g., as part of the transfer learning employed for training tag prediction models as discussed above. Similar approaches may be taken towards feature set extraction with respect to other types of audio, video and/or other non-text data items in various embodiments, which may not necessarily include music.

Tag Sources

Figure 5:
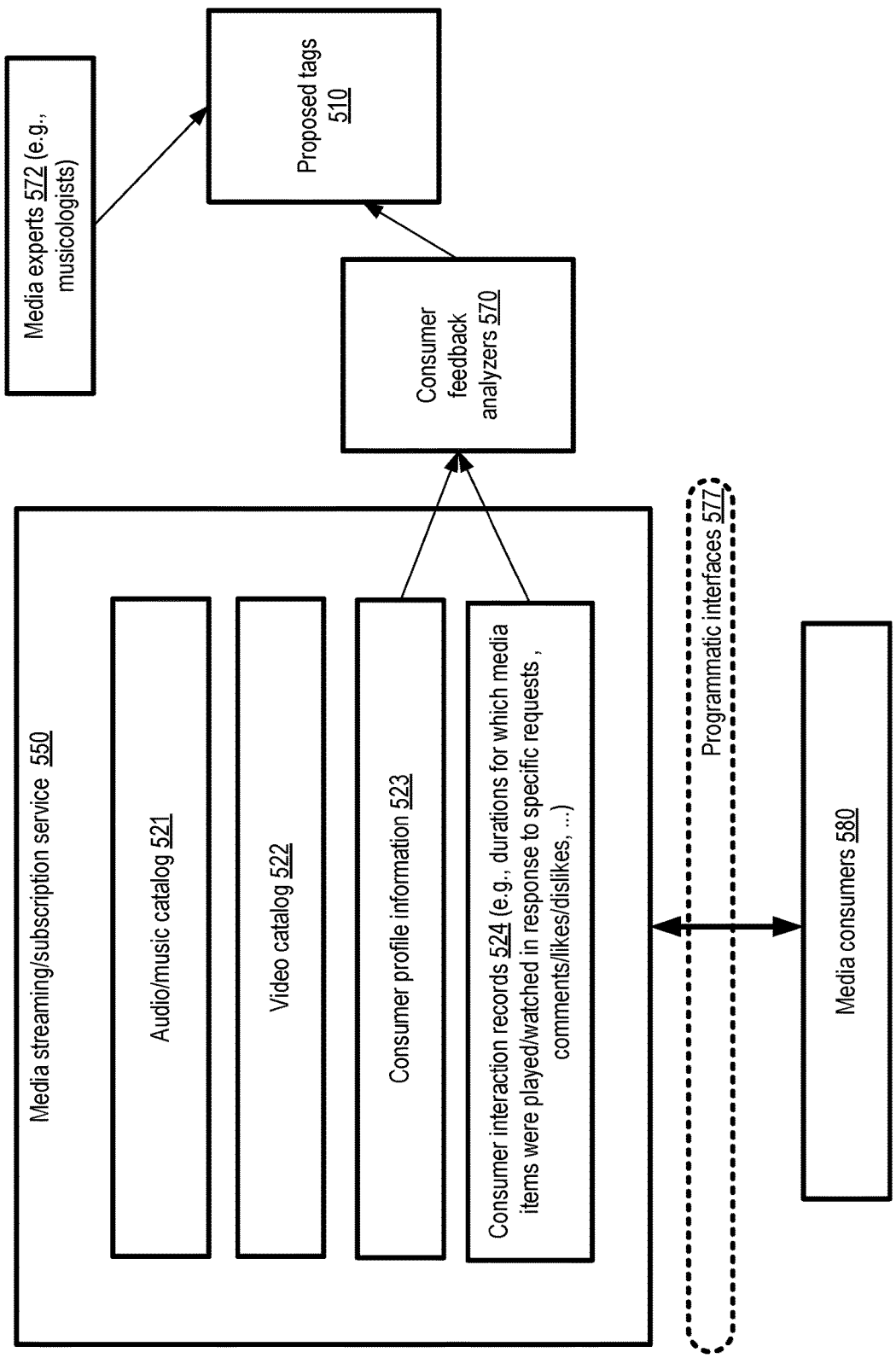
FIG. 5 illustrates example sources of proposed tags for a network-accessible media streaming/subscription service, according to at least some embodiments.

FIG. 5 illustrates example sources of proposed tags for a network-accessible media streaming/subscription service, according to at least some embodiments. A tag prediction model of the kind described above may be employed in the depicted embodiment to classify media data items at a media streaming/subscription service 550. Such a service may, for example, implement a set of programmatic interfaces 577, such as web-sites, apps for mobile phones, tablet computing devices, voice-driven personal assistant devices and the like, which can be used by media consumers 580 to submit requests and feedback pertaining to various items of an audio/music catalog 521 and/or a video catalog 522. Depending for example on parameters of the requests submitted, media data items that are tagged as belonging to broad categories (such as jazz, rock, blues and the like), and/or tagged as belonging to narrower classes (such as personalized radio stations for a given consumer) may have to be identified to satisfy the requests in the depicted embodiment, and trained tag prediction models may be used to respond to the requests. As the catalogs 521 and/or 522 expand, e.g., when the service 550 enters a new country or region, new tags may have to be identified for the newly-added media data items.

At least two broad categories of sources may be utilized to identify proposed tags 510 for the newly-added media data items of the catalogs in various embodiments. Media experts 572, such as musicologists, film reviewers, and the like may be consulted to identify some subset of the proposed tags in some embodiments. In addition, in the depicted embodiment, automated consumer feedback analyzers 570 may examine consumer interaction records 524 to identify at least some proposed tags 510. The consumer interaction records 524 may, for example, indicate durations for which media items were played or watched by various consumers 580 in response to particular requests, comments or like/dislike signals submitted by the consumers, and so on. In at least some embodiments, consumer profile information 523 (e.g., demographic information provided by the consumers 580) may be analyzed in conjunction with the explicit/implicit feedback signals provided by the media consumers in their interaction records to generate proposed tags 510. For example, based on the feedback obtained from a large group of consumers belonging to a particular state S1 of a country, a tag representing music that is popular in state S1 may be generated in one embodiment, and similar tags may be created for residents of other states, age groups and the like.

Example Use of Tag Prediction Models at Personal Assistant Devices

Figure 6:
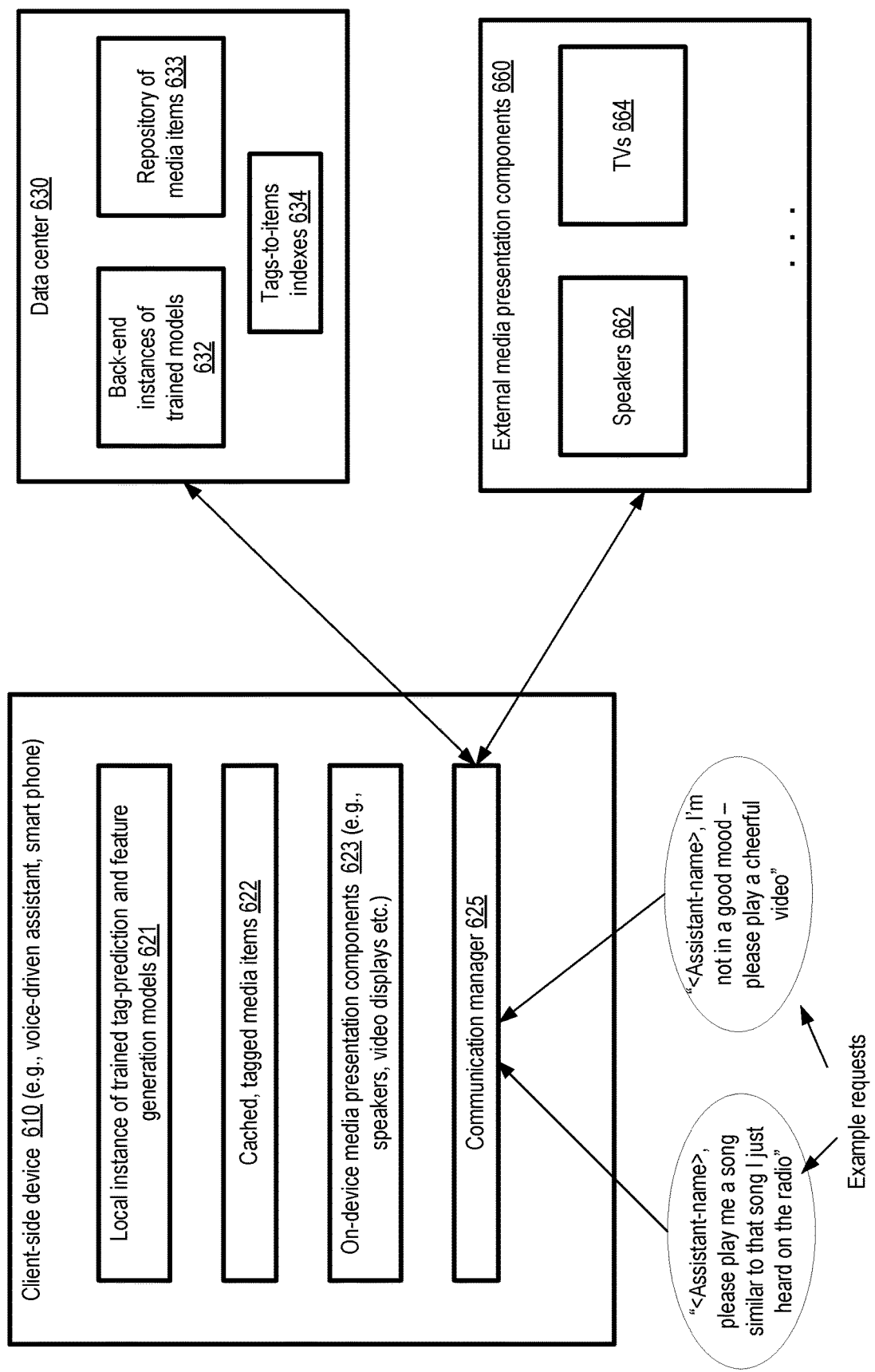
FIG. 6 illustrates example uses of media tagging models at client-side devices, according to at least some embodiments.

In at least some embodiments, trained machine learning models for tagging/classifying media data items may be deployed at various client-side devices (devices that are not locate within data centers at which the majority of back-end servers of a media analysis service or a machine learning service may be implemented), such as voice-driven personal assistant devices, smart phones and the like. FIG. 6 illustrates example uses of media tagging models at client-side devices, according to at least some embodiments. As shown, a client-side device 610 may comprise respective local instances of trained tag prediction and feature generation models 621, a set of cached, tagged media data items 622, one or more on-device media presentation components 623 such as speakers, video displays and the like, and a communication manager 625. The communication manager 625 may be responsible for, among other functionality, detecting and interpreting commands/requests 600 from a client, communicating with media analysis service components at a data center 630, and/or communication with external media presentation components 660 in the client's environment, such as external speakers 662, televisions 664 and the like.

Two types of example requests 600 which may be submitted to the device 610 in various embodiments are shown in FIG. 6. In the first request, the client may utter the equivalent of the following: "<Assistant-name>, please play me a song similar to that song I just heard on the radio". (Assistant-name represents a word or phrase used to activate voice-drive responses from the device 610 in the depicted embodiment.) In some embodiments, in order to be able to satisfy request of this type, a memory buffer in which recently-heard audio signals are stored may be maintained at the client-side device 610. A recording of the recently heard song may be analyzed using the local instances of the models 621, and tags predicted for that song may be used to identify a similar song, for example. If a song that is sufficiently similar is not found locally in cache 622, a request to retrieve a similar song may be transmitted to the data center 630 and an appropriate song may be retrieved from a repository 633 of media items. A set of tags-to-items indexes 634 may be created at the data center using the trained models 632 to help speed up tag-based retrievals of media data items. A response to the other example request shown, "<Assistant-name>, I'm not in a good mood, please play a cheerful video" may be satisfied by mapping the request to a set of one or more pre-created tags (e.g., "funny animal videos", "comedians" etc.), and retrieving media for which those tags have been assigned, either from the local cache or from the data center. In at least some embodiments, the client-side device may play the requested song (or a requested video) using external media presentation components 660, e.g., instead of using the on-device media presentation components 623.

Example Programmatic Interactions

Figure 7:
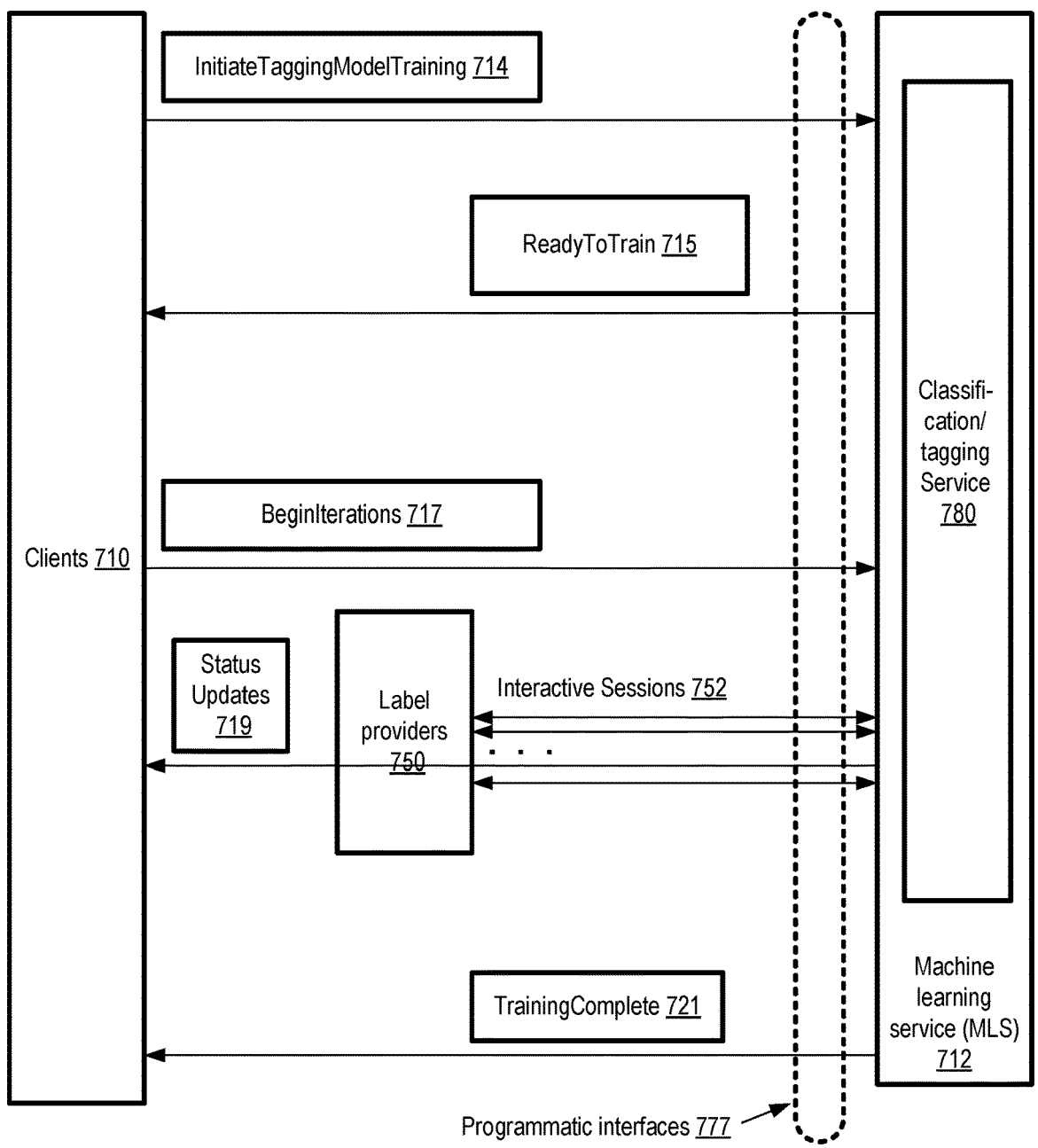
FIG. 7 illustrates example programmatic interactions between a client and a classification service for media data items, according to at least some embodiments.

FIG. 7 illustrates example programmatic interactions between a client and a classification service for media data items, according to at least some embodiments. In the depicted embodiment, a classification/tagging service 780, similar in capabilities and features to media analysis service 120 of FIG. 1, may be implemented as part of a more general machine learning service (MLS) 712. The MLS 712 may implement one or more programmatic interfaces 777, such as a set of application programming interfaces (APIs), web-based consoles or sites, command-line tools and/or graphical user interfaces that may be used by clients 710 to interact with the MLS and its components.

A client 710 may submit an InitiateTaggingModelTraining request 714 to set up a training configuration in the depicted embodiment. The request may indicate various properties of a desired media data item classifier via respective parameters; example parameters that may be specified for such a request in some embodiments are discussed in further details below in the context of FIG. 8. In response to the request, preparatory actions may be undertaken at the MLS, such as identifying one or more labeling providers that are available to help generate the training data set for the model, identifying a set of computing platforms to be used as training resources, and so on. When the MLS has completed its preparations, a ReadyToTrain response 715 may be transmitted to the client 710 in the depicted embodiment. Note that in some embodiments, it may take some time to assemble the resources needed for the training, so the ReadyToTrain response may be provided in some embodiments via e-mail or some other asynchronous communication interface. In some embodiments, a trained feature generation model may be indicated in the request 714, while in other embodiments, part of the preliminary work performed at the MLS may comprise training the feature generation model.

The client 710 may then submit a BeginIterations request 717 to the MLS in the depicted embodiment to start the training iterations of the tag prediction model itself. The MLS may start one or more labeling sessions 752 with a selected group of one or more label providers 750 in various embodiments. A relatively small training set (whose labels may, for example, be assigned automatically by the MLS based on keywords associated with target classes) may be used for the first training iteration in some embodiments, and the training set may then be enlarged via the sessions 752 based on presentation of labeling candidate media data items to the label providers 750. The labeling candidate data items may be presented as part of a visualization data set in an order based on a respective rank, with respect to estimated learning contribution, associated with including individual ones of candidates in a training set for a subsequent training iteration in at least some embodiments. As a result of the ordering, even if a label provider is able to provide just a few labels for the candidates presented at the start of the ordered collection, the MLS may be able to include more useful labels in the training sets for subsequent iterations than if randomly-selected media data items had been labeled in such embodiments. The submissions of the labels by label providers 750 may be asynchronous with respect to the start/end of any given training iteration in some embodiments—e.g., when a given training iteration is completed at the back-end servers of the MLS, the set of labels that have been submitted since the most recent training set was constructed may be used to expand the training set for the next training iteration. In at least one embodiment, the label providers 750 may not necessarily be made aware of the starting and ending of training iterations—instead, they may iteratively receive new sets of labeling candidates and submit labels for media data items as and when desired, until the training is eventually terminated.

Status indicators or updates 719 with respect to various quality metrics collected from the tag prediction model may be provided, e.g., automatically or in response to additional programmatic requests, to the clients by the MLS 712 in the depicted embodiment. In at least some embodiments, a set of metrics whose status is to be provided may be defined and/or selected by the clients 710; in other embodiments, the MLS 712 may select a default set of metrics for which status indicators are to be provided.

Eventually, e.g., after some set of specified training objectives have been satisfied and/or a budget for training resources or time has been exhausted, a TrainingComplete message 721 may be transmitted from the MLS to the client in the depicted embodiment. Alternatively, in some embodiments, training iterations may be terminated at the initiative of the client, e.g., in response to submission of a programmatic request to terminate the training by the client. After the training is complete, a trained version of the tag prediction models and/or the feature generation model may be used to classify media data items that were not used during training. A number of other types of programmatic interactions via interfaces 777 may be supported in various embodiments, and some of the programmatic interactions indicate sin FIG. 7 may not be supported in at least one embodiment.

Example Elements of Programmatic Training Requests

Figure 8:
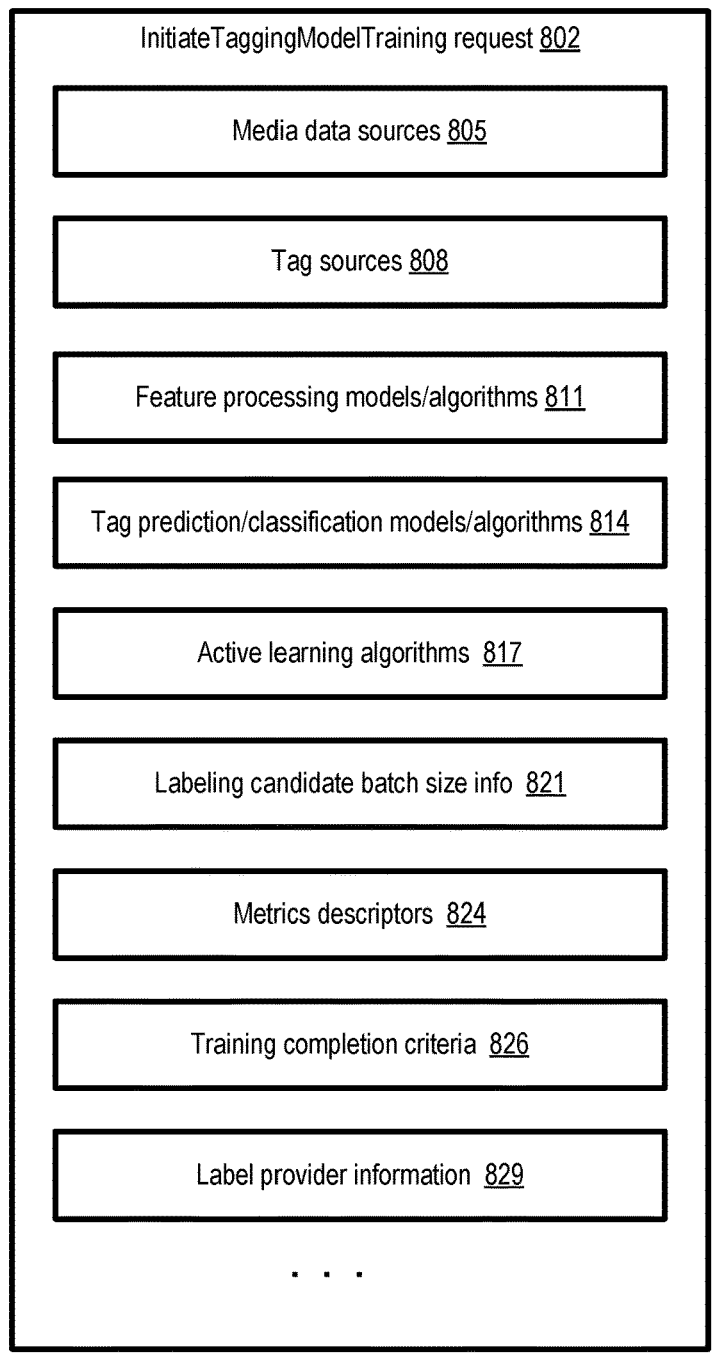
FIG. 8 illustrates example elements of a programmatic request which may be submitted to prepare a media data item tagging model, according to at least some embodiments.

FIG. 8 illustrates example elements of a programmatic request which may be submitted to prepare a media data item tagging model, according to at least some embodiments. As shown, an InitiateTaggingModelTraining request 802 may include, among other parameters, a media data sources parameter 805, a tag sources parameter 808, identifiers of one or more feature processing models/algorithms 811, identifiers of one or more tag prediction/classification algorithms 814, identifiers of one or more active learning algorithms 817, indications of one or more labeling candidate batch size selection factors/algorithms 821, one or more metrics descriptors 824 indicating the kinds of metrics to be collected from the tag prediction models, one or more training completion criteria 826, and/or label provider information 829 in the depicted embodiment.

The media data sources parameter 805 may, for example, identify one or more repositories or databases from which the media data items may be retrieved by the classification/tagging service, as well as credentials to be used to access the media data items in some embodiments. Similarly, tag sources 808 may indicate databases or repositories from which the set of tags to be assigned to the media data items may be obtained. Feature processing models/algorithms 811 may specify the techniques to be used to extract feature sets from media data items, e.g., using transfer learning from one or more pre-trained models as discussed above, in at least some embodiments. Note that at the time that an InitiateTaggingModelTraining request 802 is received, it may sometimes be the case that the feature generation model indicated in the request has not yet been trained; in such scenarios, in various embodiments the feature generation model may first have to be trained, e.g., using a labeled subset of the media data items as a training set (which may also be indicated in request 802). In one embodiment, a pointer to a trained feature generation model may be included in parameter 811, or the trained feature generation model may itself be included.

The specific types of algorithms/models to be used for tag prediction may be indicated via parameter 814 in some embodiments; similarly, the active learning algorithms to be used for intelligent selection of labeling candidates (such as some of the algorithms indicated in FIG. 3) may be indicated via parameter 817 in various embodiments. With respect to the active learning-based labeling candidate selection methodology, the factors and/or algorithms to be used to determine the batch size(s) to be used, and/or the batch size itself, may be indicated via parameter 821 in various embodiments. In at least one embodiment, batch sizes may vary as the training progresses—e.g., initially, in the first few iterations, larger batch sizes may be used, while smaller batch sizes may be used as the iteration count increases and the tag prediction model improves.

Information about one or more metrics to be collected from the training iterations (e.g., recall, precision, and the like) may be provided via metrics descriptors parameter 824 in some embodiments. Rules to determine when training iterations are to be terminated (e.g., the metric values and/or the resource budget limit to be used to stop further training) may be indicated via training completion criteria parameter 826 in some embodiments. In some embodiments, at least some level of guidance regarding label providers to be used during the media classification effort may be provided as part of request 802. For example, in the depicted embodiment, the label provider information parameter 829 may be used to indicate a set of label providers that may be available, or may have the requisite subject matter knowledge, to provide labels for the classifiers. The maximum or minimum number of label providers to be used, and/or a budget associated with label generation (e.g., in a scenario where the label providers are being paid based at least in part on the number or rate of labels they provide) may be indicated in parameter 829 in some embodiments.

In at least some embodiments, one or more of the parameters indicated in FIG. 8 may not necessarily be included in a training initiation request by a client. In various embodiments, default values may be selected at the classification/tagging service for some parameters for which specific values are not provided by the client. In some embodiments, values for individual ones of the parameters may be specified in separate programmatic interactions—that is, not all the parameter values may be sent in the same request. Other parameters, not indicated in FIG. 8, may be transmitted to the service in some embodiments.

Example Labeling Interface

Figure 9:
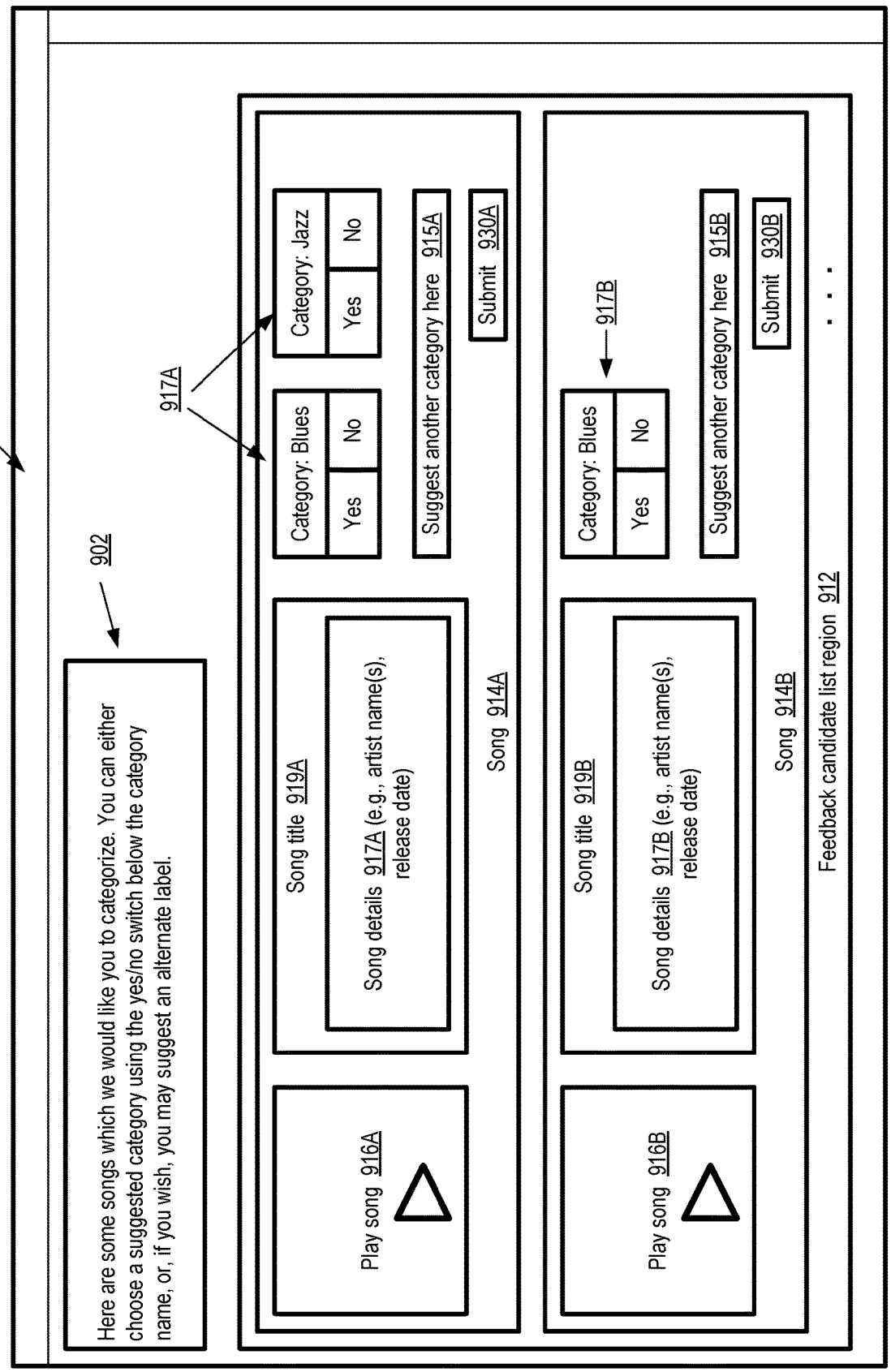
FIG. 9 illustrates an example interactive interface which may be used to obtain tags for media data items selected as labeling feedback candidates using active learning, according to at least some embodiments.

FIG. 9 illustrates an example interactive interface which may be used to obtain tags for media data items selected as labeling feedback candidates using active learning, according to at least some embodiments. In the depicted embodiment, by way of example, songs are presented as the media data items for which labels or tags are to be selected by label providers. Similar interfaces may be used in some embodiments for presenting, and obtaining labels for, other types of content such as videos. As shown, interactive interface 901, which may for example comprise one or more web pages or a graphical user interface, may comprise an introductory message area 901 and a display of information about one or more songs in feedback candidate list region 912.

In the introductory message section 902, a user/viewer may be informed that for an individual song, the user may use simple yes/no switches to select one or more displayed labels proposed for the song, or the user may ad alternative labels. In the candidate list region 912, entries corresponding to the labeling candidate songs may in some embodiments be arranged in decreasing order of expected training benefit of obtaining the corresponding tags. For example, the entry for song 914A may be positioned before the entry for song 914B in interface 901 based on results obtained from active learning algorithms of the kind discussed above that indicate that if song 914A were labeled/tagged and a record indicating the features and tag(s) for 914A were to be included in the training set for the classifier being trained, the improvement in one or more metrics of the classifier may be expected to be greater than or equal to the improvement that would be attained if song 914B were labeled and the corresponding record were to be included in the training set. In other embodiments, after the set of labeling candidate media data items are identified at the media classification/ tagging service, the items may be presented in randomized order or some other order, instead of being arranged in order of decreasing expected improvement achievable with respect to the metrics.

In the embodiment depicted in FIG. 9, for a given song 914 (e.g., 914A and 914B), an interface element 916 (e.g., 916A or 916B) that can be used to play the song may be presented, along with the song's title 919 (e.g., 919A or 919B), details such as the names of the artists/singers/ musicians involved in producing the song, a release date, etc. Corresponding to at least some of the songs, one or more proposed tags/labels 917 (such as 917A or 917B) may be presented along with respective binary selector interface elements (e.g., the "Yes" and "No" elements shown under the category/tag names "Category: Blues", "Category: Jazz", etc.) that can be used to specify the tags for the songs. The proposed tags may, for example, be generated using one or more of the models being trained in the depicted embodiment—e.g., based on a preliminary prediction obtained from the latest version of the classifier, from one or more of the models being used for active learning, and so on. In contrast to some alternative approaches, in which label providers may be required to proactively select tags/categories for the media data items, a reactive approach similar to the one illustrated in FIG. 9 in which the label providers are provided a set of alternative tags with binary selectors instead of having to come up with the tag names may simplify the tasks of the label providers considerably. Intuitively, less effort may be required to make the binary choice with respect to a presented tag, for example, than is required to think of the relevant tag without any suggestions.

Note that, as in the example of song 914A where the "yes" option may be selectable for both "Blues" and "Jazz" tags, multiple tags/categories may be selected for a given media data item in at least some embodiments; the label providers may not necessarily be required to select a single best category or tag. In the depicted embodiment, the text entry form fields 915 (e.g., 915A or 915B) may optionally be used if a label provider wishes to suggest a category other than the displayed proposed categories. The submit buttons 930 (e.g., 930A or 930B) may be used to submit the selected and/or suggested tags for individual ones of the songs 914 in the depicted embodiment. It is noted that other types of interactive interfaces, which may comprise different regions and elements than those shown in FIG. 9, or may have different layouts, may be employed in various embodiments.

Provider Network Environment

Figure 10:
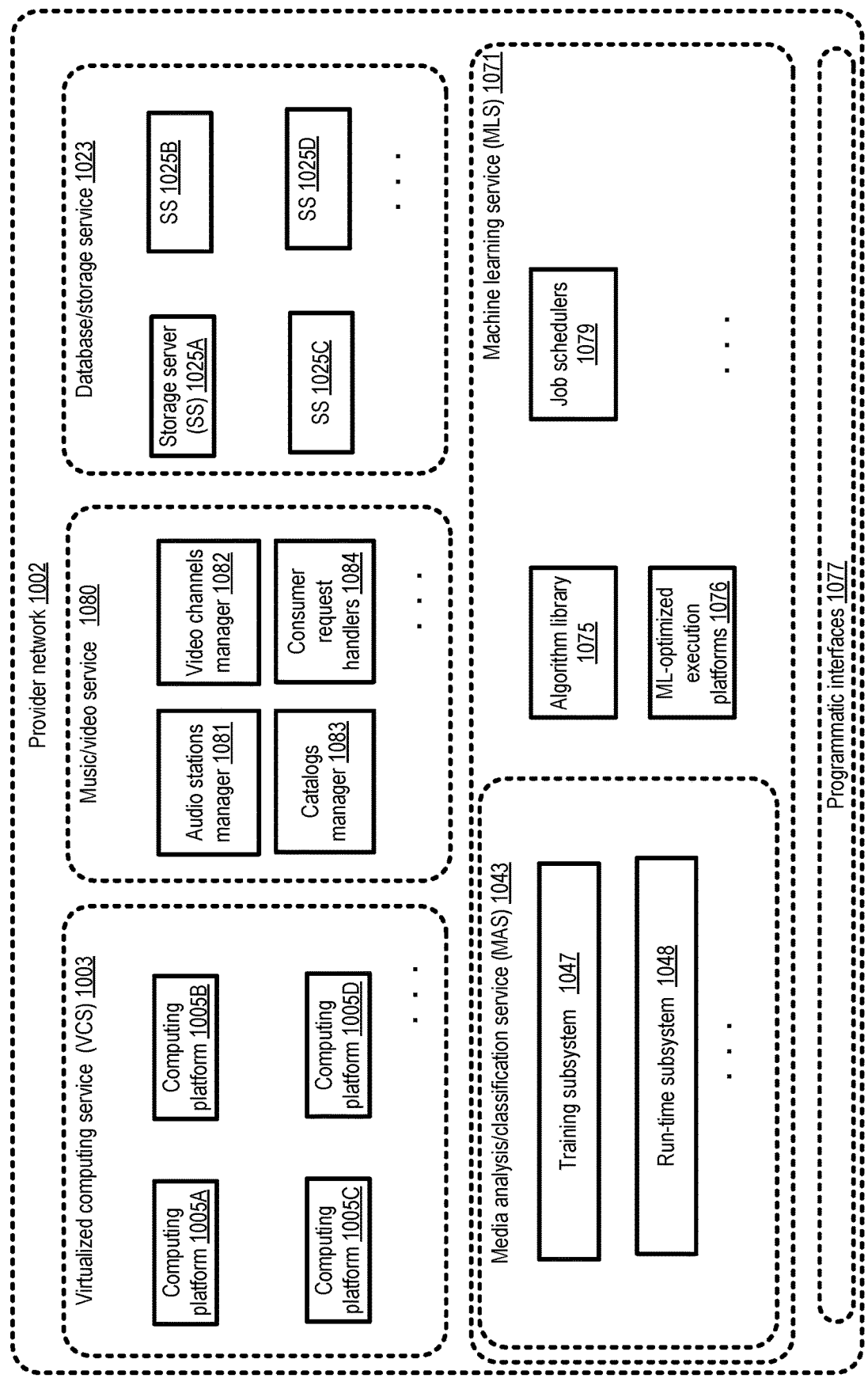
FIG. 10 illustrates a provider network environment in which a media classification service may be implemented, according to at least some embodiments.

FIG. 10 illustrates a provider network environment in which a media classification service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

The services implemented at provider network 1002 in the depicted embodiment may include, for example, a virtual computing service (VCS) 1003, a database/storage service 1023, a music/video service 1080, a machine learning service 1071 and a media analysis/classification service (MAS) 1043. The media analysis and classification service 1043 may have features and capabilities similar to media analysis service 102 of FIG. 1 in the depicted embodiment. As shown, in some embodiments, the MAS 1043 may be implemented as a part of the machine learning service 1071; in other embodiments, the MAS 1043 may be implemented as a separate service. MAS 1043 may comprise a training subsystem 1047 and a run-time subsystem 1048 in the depicted embodiment. Each of the services of provider network 1002 may expose respective sets of programmatic interfaces 1077 to its clients in the depicted embodiment, and some of the services may utilize resources of other services (for example, the MAS 1043, the music/video service 1080 and/or the machine learning service 1071 may utilize virtual machines instantiated at the virtual computing service 1003 and storage devices provided by the database/ storage service 1023). As such, some services of provider network 1002 may act as clients of other services in various embodiments.

At the training subsystem 1047, a combination of transfer learning and active learning techniques similar to those discussed above may be employed to help speed up the training of media classification/tagging models in the depicted embodiment, and the trained classifiers and feature generation models may be used at the run-time subsystem 1048 to predict tags for media items that were not included in the training sets. Resources from one or more other services may be used, for example, to train the models and/or to execute the trained models. For example, in various embodiments algorithms from algorithm library 1075 of the machine learning service may be executed on behalf of the MAS 1043 using a combination of computing platforms 1005 (e.g., 1005A-1005D) of the VCS 1003, input media data and/or intermediate or final results may be stored using storage servers 1025 (e.g., 1025A-1025D) of the database/storage service, and so on. Job schedulers 1079 of the machine learning service 1071 may schedule longrunning machine learning tasks, such as the training of some types of feature generation models used by the MAS 1043. In some embodiments, special execution platforms 1076 (e.g., platforms comprising graphics processing units (GPUs) or other processors optimized specifically for machine learning) may be available at the MLS 1071, and may be employed for some of the algorithms/models executed by the MAS.

The music/video service 1080 may utilize the models generated by the MAS 1043 in the depicted embodiment. The music/video service 1080 may support the ability to create virtual audio stations, e.g., radio stations, with the help of audio stations manager 1081, while video channels may be organized and managed by video channels manager 1082. Various catalogs of media data items, which may increase in size over time as the media/video service expands to new markets/geographies may be stored and managed (e.g., using database/storage service 1023) by catalogs manager 1083. Consumer requests handlers 1084 may respond to user requests (e.g., requests transmitted from phones, personal assistant devices of the kind discussed above, and so on) for audio and/or video content in the depicted embodiment. Tags predicted using the MAS 1043 for various audio and/or video data items using models which were trained using a combination of transfer learning and active learning techniques as discussed above may be used to respond to consumer requests, to classify catalog entries, to create and populate audio/radio stations, to create and populate video channels, and so on in various embodiments. For example, in some embodiments, personalized playlists for a client of the music/video service may be created using the models trained with the help of transfer learning and active learning, and/or playlists for various virtual radio stations may be created. The MAS may also be used by clients other than the music/video service in the depicted embodiment.

In some embodiments, at least some of the techniques discussed above for training and executing media data item tagging/classification models may be implemented without acquiring resources of network-accessible services such as those shown in FIG. 10. For example, a standalone tool implemented at one or more computing devices which are not part of a network-accessible service may be used in some embodiments.

Method for Media Item Classifier Development

Figure 11:
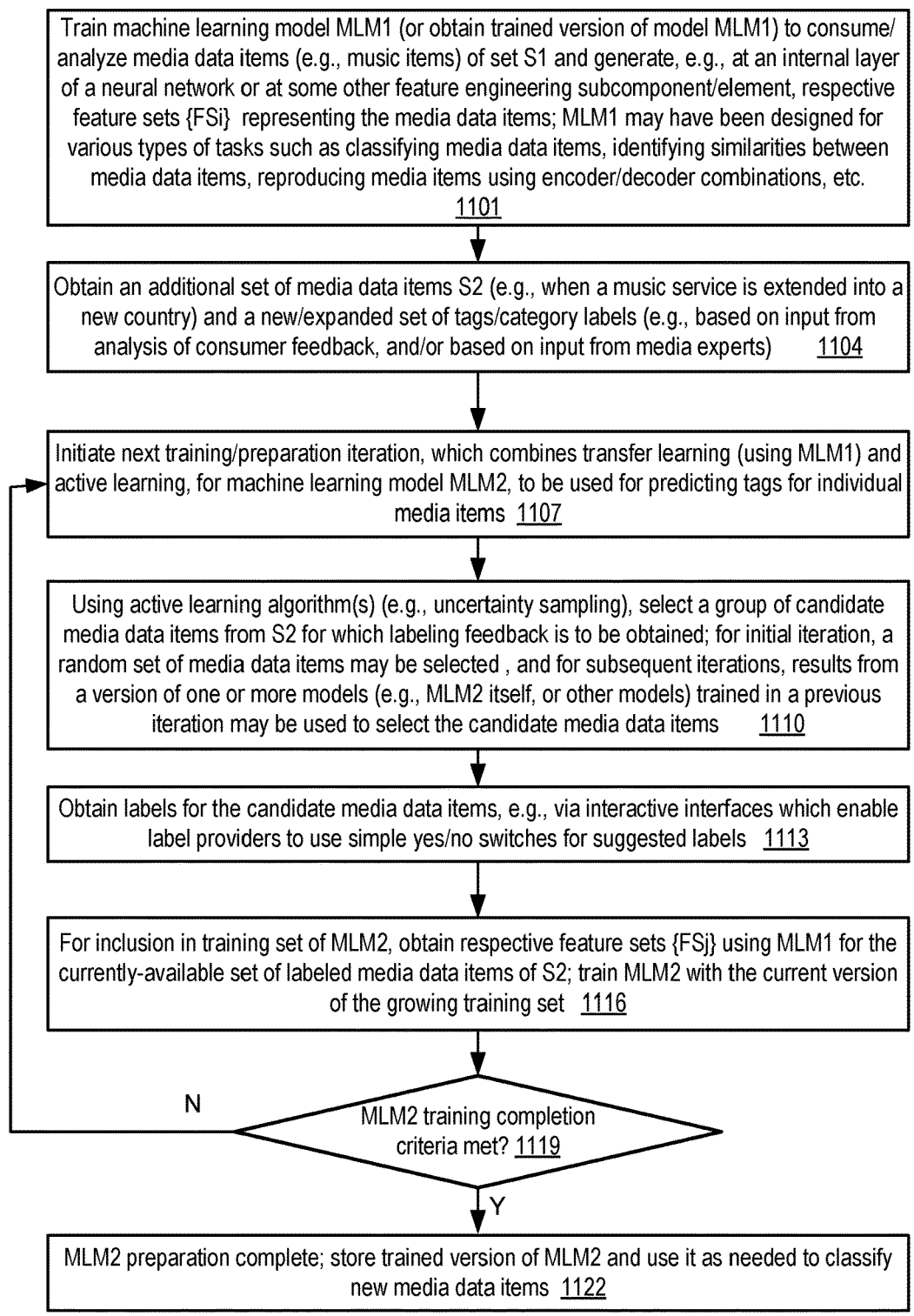
FIG. 11 is a flow diagram illustrating aspects of operations that may be performed to combine active learning and transfer learning to classify media data items, according to at least some embodiments.

FIG. 11 is a flow diagram illustrating aspects of operations that may be performed to combine active learning and transfer learning to classify media data items, according to at least some embodiments. As shown in element 1101, a first machine learning model MLM1 may be trained (or a trained version of such a model may be obtained), from which rich feature sets {FSi} may be obtained for individual media data items (such as music items, video recordings and the like) of a first collection or set S1 of media data items. Such feature sets may be generated, for example, at one or more feature processing/engineering elements of MLM1, such as an internal or hidden layer in scenarios in which MLM1 comprises multiple layers of a deep neural network. MLM1 itself may have been designed and trained for any of a variety of tasks in different embodiments, such as to itself classify some media data items, to identify similarities among media data items, reproduce input media items using an encoder/decoder combination and so on. In some embodiments, the feature engineering elements from which the feature sets are obtained may include, for example, layers at which principal component analysis (PCA) algorithms are implemented to transform spectral features of the media data items, Gaussian mixture models are used to generate respective audio codebook histograms corresponding to individual data items, and/or temporal pooling of such histograms is performed.

An addition set of media data items S2 (e.g., identified when a music service is extended into a new country) and a corresponding new/expanded set of tags/category labels (e.g., based on input from automated analysis of consumer feedback with respect to one or more media sources, and/or based on input from media experts) may be obtained in various embodiments (element 1104).

One or more training iterations to prepare a second machine learning model (MLM2) to predict tags from the new or expanded set of tags may then be initiated (element 1107) in at least some embodiments. In individual ones of the iterations, a combination of active learning and transfer learning (from MLM2, which is already trained) may be employed. MLM2 itself may comprise any of various types of classification models in different embodiments, such as neural network models, logistic regression models, support vector machines, tree-based models, Bayesian models or the like. In some embodiments, for example, a request to train a tag prediction model may be received via a programmatic interface of a media analysis/classification service, and such a request may include indications of the set S2 and the new/expanded set of tags for MLM2. In at least one embodiment, the request may include or indicate the trained version of MLM1. In another embodiment, MLM1 may itself be trained in response to such a programmatic request, and may later be used to generate feature sets to be used to train a second machine learning model.

Using one or more active learning algorithm(s) (e.g., uncertainty sampling, query-by-committee or the like), a group of candidate media data items for which labeling feedback is to be obtained may be selected from S2 (element 1110), such that the selected group is expected to be more likely to improve the. For the initial iteration, in some embodiments a random set of media data items may be selected, while for subsequent iterations, results from a version of one or more models (e.g., MLM2 itself, or other models) trained in a previous iteration may be used to select the candidate media data items for labeling using the active learning methodology.

Labels for at least some of the candidate media data items selected using active learning may then be obtained (element 1113), e.g., from a pool of human annotators or label providers and/or from one or more programs. For the label providers, in at least some embodiments an interactive interface may be implemented in which one or more proposed tag names and corresponding yes/no indicators are provided for a given media data item, thereby relieving the label providers from having to think of tags themselves. The proposed tags may, for example, be generated based on preliminary predictions obtained for the labeling candidate data items, e.g., using the current version of MLM2 or using some other set of machine learning algorithms that may be used to active learning. In one embodiment, if a label provider does not find the set of proposed tags generated by the media classification service adequate, the label provider may suggest one or more additional tags for a given media data item via a programmatic interface. In at least some embodiments, instead of or in addition to using media experts as label providers, the labels may be obtained using non-experts, automated techniques (such as analysis of explicit/implicit feedback from content consumers), and/or other sources.

For inclusion in the training set of MLM2, respective feature sets {FSj} may be obtained using MLM1 for the currently-available set of labeled media data items of S2 (element 1116) in at least some embodiments. The current version of the growing training set may then be used perform the next round of training of MLM2. As such, the learning already completed (during MLM1's training) regarding characterizing media data items via a rich set of features may be transferred to MLM2.

If the training completion criteria for MLM2 have been met after the current round of training, as detected in operations corresponding to element 1119, the preparation of MLM2 may be considered complete (element 1122). A trained version of MLM2, obtained as a result of the accumulated training iterations performed thus far, may be stored and used to classify new media data items (i.e., items that were not in the training sets of the iterations) as needed in various embodiments. For example, in some embodiments, the trained version of MLM2 (and/or MLM1) may be used to respond to requests for media data items that are submitted via client-side devices such as voice-driven personal assistant devices, smart phones etc. When such a request to play one or more media data items is received, results such as predicted tags obtained from MLM2 and/or MLM1 may be used to select the specific media data items are played in such embodiments. Tags generated using MLM1 and/or MLM2 may also be used, for example, to include specific media data items to be included in personalized playlists for clients of a music service or video service, or in a virtual radio station or video channel. In some embodiments in which both MLM1 and MLM2 are trained to predict tags, MLM2 may be trained to predict tags from a combination of the set of tags that were used for labeling items in S1 and the set of tags used for labeling additional items in set S2. That is, after MLM2 is trained, it may be used for predicting labels for any media data item, and MLM2 may no longer have to be used in such embodiments. In other embodiments, in contrast, MLM1 may continue to be used even after MLM2 is trained—e.g., MLM1 and MLM2 may be used together as part of an ensemble of classification models, or MLM1 and MLM2 may be used independently.

If the training completion criteria are not satisfied (as also detected in operations corresponding to element 1119), the next iteration may be initiated and operations corresponding to elements 1107 onwards may be repeated in the depicted embodiment. In some embodiments, the training completion criteria may involve determining whether the quality of the tag predictions being generated by MLM2 (as evaluated, for example, using a hold-out test set), meets some desired threshold; in other embodiments, training may be terminated after a resource or time budget designated for the training phase has been exhausted.

It is noted that in various embodiments, some of the operations shown in FIG. 11 may be implemented in a different order than that shown in the figure, or may be performed in parallel rather than sequentially. Additionally, some of the operations shown in FIG. 11 may not be required in one or more implementations. In at least one embodiment, the techniques illustrated in FIG. 11 may be employed for classifying or tagging data items that may not necessarily represent digitized media content (such as music, video etc.)—for example, the techniques may be used for classifying items of a retail catalog, with images, videos, and/or text descriptions of the items being used as input to the machine learning algorithms.

Use Cases

The techniques described above, of utilizing a combination of active learning and transfer learning to quickly train tag prediction models or classifiers for media data items may be extremely useful in a variety of scenarios. Many network-accessible music and/or video services may add large numbers of media data items to their catalogs, especially as they expand into new regions or markets. In order to respond to user requests (e.g., requests for songs of a particular genre or mood), the catalog entries may have to be assigned respective sets of tags. Classifying millions of songs or videos manually may be intractable within the desired timeframes. However, if a first machine learning model for media analysis (such as a deep neural network model) can be trained, using a first subset of media data items, such that it is able to generate rich feature sets that characterize the media data items well, it may then become possible to transfer the knowledge gained regarding feature processing from the first model to other media analysis models (such as a simpler tag prediction model that utilized logistic regression). Furthermore, by using active learning iteratively to select unlabeled media data items that are most likely to quickly improve the predictions/classifications of the second model for which training sets are accumulated using feature sets obtained from the first model, the total number of labeled data items that are needed to obtain a high quality classifier may be reduced substantially compared to other approaches, thereby saving substantial computing, memory, storage and/or networking resources. As a result, it may become possible to very quickly generate tags for new unlabeled media data items added to the catalog of the media service.

Illustrative Computer System

Figure 12:
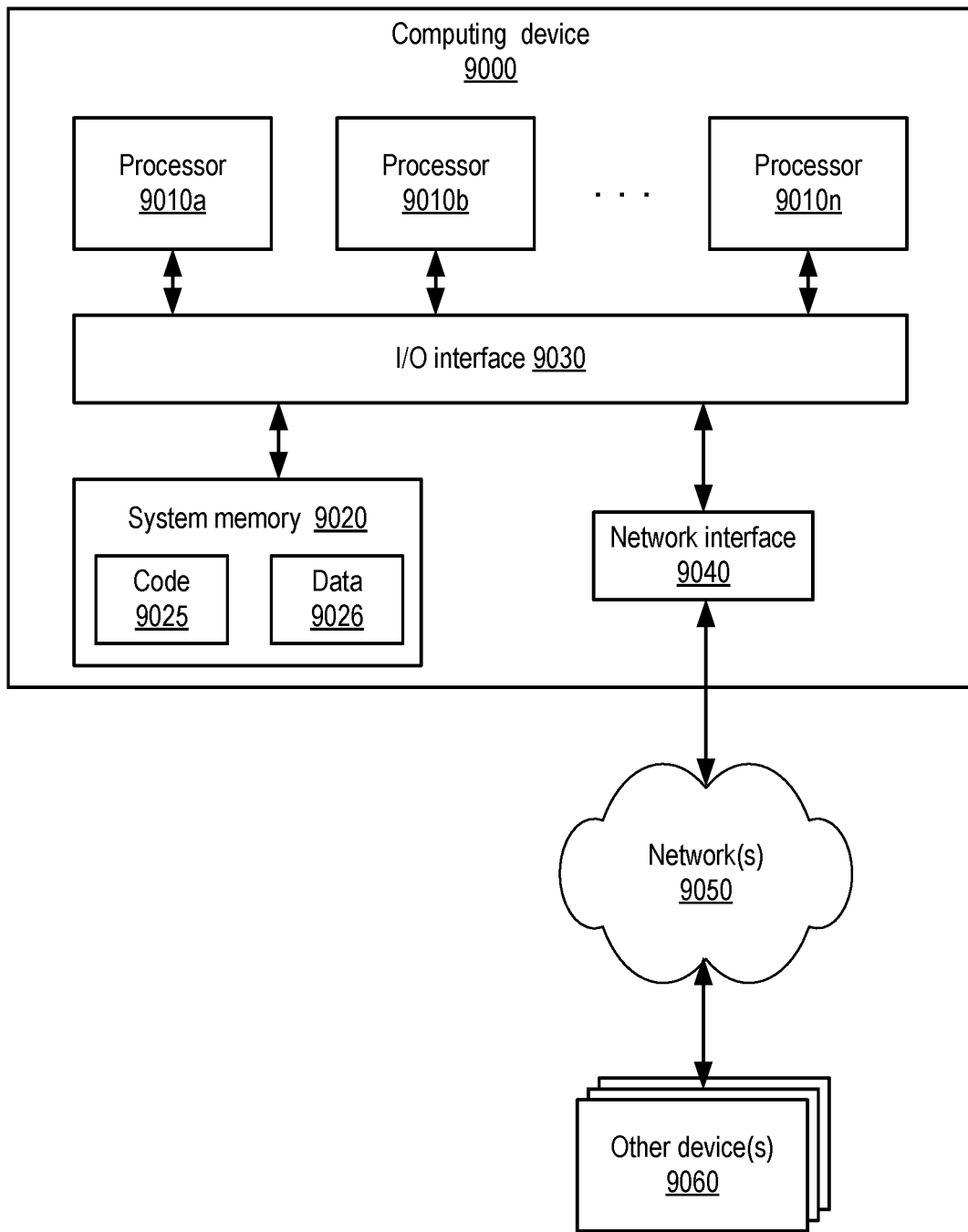
FIG. 12 is a block diagram illustrating an example computing device that may be used in at least some embodiments.

In at least some embodiments, a server that implements a portion or all of one or more of the technologies described herein, including the techniques to combine active learning and transfer learning to quickly train media data item classification models, as well as various components of a machine learning service or an a media analysis/classification service may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
   performing, by one or more computing devices:
   implementing a plurality of preparation iterations of a first machine learning model until a preparation completion criterion is met, wherein a particular one of the preparation iterations comprises:
   selecting, from a first collection of media data items, based at least in part on an active learning algorithm, a group of one or more media data items for which labeling feedback is to be obtained for the particular preparation iteration;
   obtaining the labeling feedback for respective labels for the one or more media data items of the group based at least in part on user input associated with the one or more media data items, wherein the user input indicates at least one label of at least one of the one or more media items, wherein the at least one label is based on a tag name of a first tag in a first set of tags;
   generating, using one or more feature processing elements of a second machine learning model, a respective feature set corresponding to individual media data items for which respective labels were obtained; and
   training, using a training set which includes the respective feature sets, the first machine learning model to predict, corresponding to individual media data items, respective tags from at least the first set of tags; and
   storing a trained version of the first machine learning model obtained using the preparation iterations.

2. The method as recited in claim 1, wherein at least one media data item of the first collection comprises one or more of: (a) at least a portion of a music recording, (b) at least a portion of an audio recording of a book, a podcast, or a magazine article, (d) at least a portion of a video, or (e) at least a portion of a description of an item of a retail catalog.

3. The method as recited in claim 1, wherein the active learning algorithm comprises one or more of: (a) an uncertainty sampling algorithm, (b) a query by committee algorithm, (c) an expected model change algorithm, (d) an expected error reduction algorithm, (e) a variance reduction algorithm, or (f) a density-weighted algorithm.

4. The method as recited in claim 1, wherein the second machine learning model comprises one or more of: (a) another model used to predict one or more tags, from a second set of tags, for individual media data items, (b) an encoder-decoder model trained to replicate media data items provided as input to the encoder-decoder model, (c) a model used to identify, with respect to an input media data item, one or more other media data items which meet a similarity criterion with respect to the input media data item, (d) a model which concatenates at least a portion of a text attribute of an input media data item to a feature vector derived from one or more non-text attributes of the input media data item.

5. The method as recited in claim 1, wherein at least one machine learning model of the first and second machine learning models comprises one or more of: (a) a neural network, (b) a logistic regression model, (c) a support vector machine (SVM) model, (d) a tree-based model or (e) a Bayesian model.

6. The method as recited in claim 1, wherein the respective labels are obtained via one or more programmatic interfaces from one or more of: (a) an automated feedback analyzer which analyzes consumer feedback with respect to one or more media sources, or (b) a pool of one or more media data item label providers.

7. The method as recited in claim 1, wherein at least one label of the respective labels is obtained via an interactive programmatic interface which includes, corresponding to a particular media data item, (a) the tag name of a first tag of the first set of tags and (b) a binary selector for the first tag, wherein a first setting for the binary selector indicates that the particular media data item is to be labeled with the first tag name, and wherein a second setting for the binary selector indicates that the particular media data item is not to be labeled with the first tag.

8. The method as recited in claim 7, wherein the interactive programmatic interface includes an entry field enabling an indication of a proposed additional tag for the particular media data item to be submitted.

9. The method as recited in claim 1, wherein the implementing of the preparation iterations is responsive to a programmatic request submitted to a network-accessible service.

10. The method as recited in claim 1, wherein the particular preparation iteration comprises:
determining a number of media data items to be included in the group of one or more media data items based at least in part on one or more of: (a) a type of machine learning algorithm being used for the first machine learning model, or (b) a number of available label providers.

11. A non-transitory computer-accessible storage medium storing program instructions that when executed on one or more processors cause the one or more processors to:
implement a plurality of training iterations of a first machine learning model until a training completion criterion is met, wherein a particular one of the training iterations comprises:
selecting, from a first collection of data items, based at least in part on an active learning algorithm, a group of one or more data items for which labeling feedback is to be obtained for the particular training iteration;
obtaining the labeling feedback for respective labels for the one or more data items of the group based at least in part on user input associated with the one or more media data items, wherein the user input indicates at least one label of at least one of the one or more data items, wherein the at least one label is based on a tag name of a first tag in a first set of tags;
generating, using one or more feature processing elements of a second machine learning model, a respective feature set corresponding to individual data items for which respective labels were obtained; and
training, using a training set which includes the respective feature sets, the first machine learning model to predict, corresponding to individual data items, respective tags from at least the first set of tags; and
store a trained version of the first machine learning model obtained using the training iterations.

12. The non-transitory computer-accessible storage medium as recited in claim 11, wherein at least one data item of the first collection comprises one or more of: (a) at least a portion of a music recording, (b) at least a portion of an audio recording of a book, a podcast, or a magazine article, (c) at least a portion of a video or (d) at least a portion of an image.

13. The non-transitory computer-accessible storage medium as recited in claim 11, wherein the active learning algorithm comprises one or more of: (a) an uncertainty sampling algorithm, (b) a query by committee algorithm, (c) an expected model change algorithm, (d) an expected error reduction algorithm, (e) a variance reduction algorithm, or (f) a density-weighted algorithm.

14. The non-transitory computer-accessible storage medium as recited in claim 11, wherein the second machine learning model comprises one or more of: (a) another model used to predict one or more tags, from a second set of tags, for individual data items, (b) an encode-decoder model trained to replicate data items provided as input to the encoder-decoder model, (c) a model used to identify, with respect to an input data item, one or more other data items which meet a similarity criterion with respect to the input media data item, (d) a model which concatenates at least a portion of a text attribute of an input data item to a feature vector derived from one or more non-text attributes of the input data item.

15. The non-transitory computer-accessible storage medium as recited in claim 11, wherein the one or more computing devices are configured to:
analyze a plurality of interaction records of one or more music consumers to determine at least one tag of the first set of tags.

16. A system, comprising:
one or more computing devices configured to implement a plurality of training iterations of a first machine learning model until a training completion criterion is met, wherein to perform a particular one of the training iterations the one or more computing devices are configured to perform at least:
select, from a first collection of data items, based at least in part on an active learning algorithm, a group of one or more data items for which labeling feedback is to be obtained for the particular training iteration;
obtain the labeling feedback for respective labels for one or more data items of the group based at least in part on user input associated with the one or more media data items, wherein the user input indicates at least one label of at least one of the one or more data items, wherein the at least one label is based on a tag name of a tag in a first set of tags;
generate, using one or more feature processing elements of a second machine learning model, a respective feature set corresponding to individual data items for which respective labels were obtained; and
train, using a training set which includes the respective feature sets, the first machine learning model to predict, corresponding to individual data items, respective tags from at least the first set of tags; and wherein the one or more computing devices are further configured to store a trained version of the first machine learning model obtained using the training iterations.

17. The system as recited in claim 16, wherein at least one data item of the first collection comprises one or more of: (a) at least a portion of a music recording, (b) at least a portion of an audio recording of a book, a podcast, or a magazine article, (c) at least a portion of a video or (d) at least a portion of an image.

18. The system as recited in claim 16, wherein the active learning algorithm comprises one or more of: (a) an uncertainty sampling algorithm, (b) a query by committee algorithm, (c) an expected model change algorithm, (d) an expected error reduction algorithm, (e) a variance reduction algorithm, or (f) a density-weighted algorithm.

19. The system as recited in claim 16, wherein the second machine learning model comprises one or more of: (a) another model used to predict one or more tags, from a second set of tags, for individual data items, (b) an encode-decoder model trained to replicate data items provided as input to the encoder-decoder model, (c) a model used to identify, with respect to an input data item, one or more other data items which meet a similarity criterion with respect to the input media data item, (d) a model which concatenates at least a portion of a text attribute of an input data item to a feature vector derived from one or more non-text attributes of the input data item.

20. The system as recited in claim 16, wherein the one or more computing devices are configured to analyze a plurality of interaction records of one or more music consumers to determine at least one tag of the first set of tags.

* * * * *